US012772301B2

(12) United States Patent
Peng et al.

(10) Patent No.: US 12,772,301 B2
(45) Date of Patent: Oct. 20, 2026

(54) SESSION ESTABLISHMENT METHOD AND APPARATUS

(71) Applicant: HUAWEI TECHNOLOGIES CO., LTD., Shenzhen (CN)

(72) Inventors: Chenghui Peng, Shanghai (CN); Jianjun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 574 days.

(21) Appl. No.: 18/189,355

(22) Filed: Mar. 24, 2023

(65) Prior Publication Data

US 2023/0232468 A1 Jul. 20, 2023

Related U.S. Application Data

(63) Continuation of application No. PCT/CN2021/117857, filed on Sep. 11, 2021.

(30) Foreign Application Priority Data

Sep. 24, 2020 (CN) ......................... 202011016216.9

(51) Int. Cl.
*H04W 76/10* (2018.01)
*H04W 8/22* (2009.01)

(52) U.S. Cl.
CPC ............. *H04W 76/10* (2018.02); *H04W 8/22* (2013.01)

(58) Field of Classification Search
CPC ................................ H04W 76/11; H04W 8/22
See application file for complete search history.

(56) References Cited

U.S. PATENT DOCUMENTS

2018/0176876 A1* 6/2018 Alam .................... H04W 60/00
2020/0053615 A1* 2/2020 Chiba ............... H04W 36/0022
(Continued)

FOREIGN PATENT DOCUMENTS

CN 108307530 A 7/2018
CN 110650034 A 1/2020

OTHER PUBLICATIONS

3rd Generation Partnership Project; Technical Specification Group Services and System Aspects; Architecture Enhancements for Dedicated Core Networks; Stage 2 (Release 13). 3GPP TR 23.707 V13.0.0 (Dec. 2014). total 39 pages.
(Continued)

*Primary Examiner* — Fabricio R Murillo Garcia
(74) *Attorney, Agent, or Firm* — HAUPTMAN HAM, LLP

(57) ABSTRACT

A session establishment method includes receiving, by a first core network device, a first request from an access network device, sending, by the first core network device, a second request to the second core network device based on the first request, receiving, by the first core network device, a second response from the second core network device, sending, by the first core network device, a first response to the access network device, and establishing, by the first core network device, the session based on the first response. The first request is useable to request to establish a session of a terminal device, and the first request includes information about a second core network device corresponding to the terminal device. The second response is useable to respond to the second request. The first response is useable to respond to the first request.

19 Claims, 13 Drawing Sheets

(56) References Cited

U.S. PATENT DOCUMENTS

| | | | | |
|---|---|---|---|---|
| 2020/0252839 A1* | 8/2020 | Tang | ............... | H04W 36/00222 |
| 2020/0314955 A1* | 10/2020 | Velev | .................... | H04W 76/11 |
| 2022/0141905 A1* | 5/2022 | Gan | ................ | H04W 36/00222 370/328 |

OTHER PUBLICATIONS

International Search Report issued in corresponding International Application No. PCT/CN2021/117857, dated Nov. 25, 2021, pp. 1-9.

Catt et al:"UPF selection based on VLAN and Traffic Class." SA WG2 Meeting #S2-138E Apr. 20-23, 2020, Elbonia. S2-2003049. total 25 pages.

Extended European Search Report issued in corresponding European Application No. 21871300.6, dated Jan. 5, 2024, pp. 1-11.

* cited by examiner

NCP: Network control part
NDP: Network data part
UCP: User control part
UDP: User data part
U-App: User application NCP: Network control part
NDP: Network data part
UCP: User control part
UDP: User data part
U-App: User application NCP: Network control part
UCP: User control part
UDP: User data part
U-App: User application NCP: Network control part
NDP: Network data part
UCP: User control part
UDP: User data part NCP: Network control part
UCP: User control part
UDP: User data part NCP: Network control part
NDP: Network data part
UCP: User control part
UDP: User data part

SESSION ESTABLISHMENT METHOD AND APPARATUS

CROSS-REFERENCE TO RELATED APPLICATIONS

This application is a continuation of International Application No. PCT/CN2021/117857, filed on Sep. 11, 2021, which claims priority to Chinese Patent Application No. 202011016216.9, filed on Sep. 24, 2020, the disclosures of the aforementioned applications are hereby incorporated by reference in their entireties.

TECHNICAL FIELD

This application relates to the field of communication technologies, and in particular, to a session establishment method and an apparatus.

BACKGROUND

In a 5$^{th}$ generation (5G) mobile communication system of some approaches, a plurality of network elements are used during establishment of a session between a terminal device and a network. For example, an access and mobility management function (AMF) selects a session management function (SMF). The SMF selects a policy control function (PCF), a user plane function (UPF), and the like.

However, the foregoing session establishment process is complex.

SUMMARY

One or more embodiments of the present application provide a session establishment method and an apparatus, to effectively simplify a session establishment process, so that the session establishment process is more flexible.

According to a first aspect, this application provides a session establishment method. The method includes: A first core network device receives a first request from an access network device, where the first request is used to request to establish a session of a terminal device, and the first request includes information about a second core network device corresponding to the terminal device; the first core network device sends a second request to the second core network device according to the first request; the first core network device receives a second response from the second core network device, where the second response is used to respond to the second request; the first core network device sends a first response to the access network device, where the first response is used to respond to the first request; and the first core network device establishes the session based on the first response.

In a some embodiments, the second core network device may be understood as a core network device corresponding to the terminal device. That is, the second core network device may be understood as a user-level core network device. For example, the second core network device may be configured to execute a network policy of the terminal device (namely, a user), for example, may perform network access authentication, session establishment, or session forwarding of the terminal device based on data, a configuration policy, or the like of the terminal device. The first core network device may be understood as a network-level core network device. For example, the first core network device may be configured to execute a network policy of a carrier, for example, maintain a correspondence between a terminal device and a second core network device.

In the some embodiments, the first request includes the information about the second core network device corresponding to the terminal device, so that the first core network device may send, based on the information about the second core network device, the second request to the second core network device corresponding to the terminal device. Therefore, the second core network device may respond to the second request. According to the some embodiments, the first core network device interacts with the second core network device corresponding to the terminal device, so that session establishment of the terminal device can be implemented, thereby simplifying core network deployment. In addition, the second core network device corresponding to the terminal device implements related processing on the terminal device, and this can improve security of the terminal device without requiring a plurality of network elements in the session establishment of the terminal device.

In some embodiments, the information about the second core network device corresponding to the terminal device includes an identifier of the terminal device and/or an identifier of the second core network device, and the identifier of the terminal device is associated with the identifier of the second core network device.

The first request directly includes the identifier of the second core network device, and the first core network device may clearly learn that the second request is sent to the second core network device. This is easy to implement, and improves efficiency of the first core network device. The first request includes the identifier of the terminal device, and the first core network device may determine the identifier of the second core network device based on the identifier of the terminal device, thereby improving accuracy of determining the identifier of the second core network device by the first core network device, and effectively avoiding that an invalid terminal device requests to establish a session.

In some embodiments, the second core network device corresponds to the terminal device, or the second core network device corresponds to a plurality of terminal devices including the terminal device.

In the some embodiments, the terminal device and the second core network device may be in a one-to-one correspondence, that is, one second core network device may serve one terminal device. This facilitates management of the second core network device and improves efficiency of serving the terminal device. Alternatively, the second core network device and the terminal device may be in a one-to-many relationship, that is, one second core network device may serve a plurality of terminal devices. This facilitates the second core network device to manage the plurality of terminal devices and improves management efficiency.

In some embodiments, the first core network device is configured to implement any one or more of the following functions: session management, policy management, charging management, or authentication management.

In some embodiments, the first core network device is further configured to implement an access and mobility management function.

In some embodiments, the second core network device is configured to implement any one or more of the following functions: subscriber data management, access management, user policy management, charging management, or session management.

In some embodiments, a correspondence between the identifier of the terminal device and the identifier of the second core network device is stored in the first core network device.

The correspondence between the identifier of the terminal device and the identifier of the second core network device is stored in the first core network device, so that the first core network device may timely determine (or search for) the identifier of the second core network device based on the identifier of the terminal device.

In some embodiments, the correspondence between the identifier of the terminal device and the identifier of the second core network device is stored in a first database.

The first database herein may be understood as a database in the second core network device, or a database corresponding to the second core network device. That is, a specific storage location of the first database is not limited in this application.

In some embodiments, that the first core network device sends a second request to the second core network device according to the first request includes: When the first request is valid, the first core network device sends the second request to the second core network device according to the first request.

The first request being valid may be understood as that the first core network device may further perform authentication and the like on the terminal device according to the first request. To be specific, when the first request is secure and reliable, the first core network device sends the second request to the second core network device, to ensure security of the second core network device.

In some embodiments, the second response includes first session configuration information, and the first session configuration information indicates session configuration information of a third core network device corresponding to the terminal device.

The third core network device corresponding to the terminal device may be understood as that the identifier of the terminal device is associated with an identifier of the third core network device. To be specific, the third core network device may serve one or more corresponding terminal devices including the terminal device. In some embodiments, a validity period of a correspondence between the terminal device and the third core network device is not limited in this application.

In some embodiments, that the first core network device establishes the session based on the first response includes: The first core network device sends a third request to the third core network device based on the first session configuration information, where the third request is used to request to establish a session between the terminal device and the third core network device; and the first core network device receives a third response from the third core network device, where the third response is used to respond to the third request.

In some embodiments, the first response carries the first session configuration information and/or second session configuration information, and the second session configuration information indicates session configuration information of a fourth core network device. That the first core network device establishes the session based on the first response includes: The first core network device sends a fourth request to the fourth core network device based on the second session configuration information, where the fourth request is used to request to establish a session between the terminal device and the fourth core network device; and the first core network device receives a fourth response from the fourth core network device, where the fourth response is used to respond to the fourth request.

In some embodiments, before that a first core network device receives a first request from an access network device, the method further includes: The first core network device receives a fifth request from the access network device, where the fifth request is used to request to authenticate a network access request of the terminal device, and the fifth request includes information about the second core network device corresponding to the terminal device; the first core network device sends a sixth request to the second core network device according to the fifth request; the first core network device receives a sixth response from the second core network device, where the sixth response is used to respond to the sixth request; and the first core network device sends a fifth response to the access network device, where the fifth response is used to respond to the fifth request.

In some embodiments, the first request is obtained by the access network device according to a seventh request of the terminal device.

According to a second aspect, this application provides a session establishment method. The method includes: A second core network device receives a second request from a first core network device, where the second request is obtained by the first core network device according to a first request of an access network device, the first request is used to request to establish a session of a terminal device, the first request is obtained by the access network device according to a seventh request of the terminal device, and the first request includes information about the second core network device corresponding to the terminal device; and the second core network device sends a second response to the first core network device, where the second response is used to respond to the second request.

In some embodiments, that the second core network device sends a second response to the first core network device includes: When the second request is valid, the second core network device sends the second response to the first core network device.

In some embodiments, the second core network device corresponds to the terminal device, or the second core network device corresponds to a plurality of terminal devices including the terminal device.

In some embodiments, the first core network device is configured to implement any one or more of the following functions: session management, policy management, charging management, or authentication management.

In some embodiments, the first core network device is further configured to implement an access and mobility management function.

In some embodiments, the second core network device is configured to implement any one or more of the following functions: subscriber data management, access management, user policy management, charging management, or session management.

In some embodiments, the second response includes first session configuration information, and the first session configuration information indicates session configuration information of a third core network device corresponding to the terminal device.

For beneficial effects of the second aspect, refer to the beneficial effects of the first aspect. Details are not described herein.

According to a third aspect, this application provides a session establishment method. The method includes: A terminal device obtains an identifier of a second core network device corresponding to the terminal device; the terminal device sends a seventh request, where the seventh request is used to request to establish a session of the terminal device, and the seventh request includes the identifier of the second core network device; the terminal device receives a seventh response, where the seventh response is used to respond to the seventh request; and the terminal device performs the session based on the seventh response.

For beneficial effects of the third aspect, refer to the beneficial effects of the first aspect. Details are not described herein.

According to a fourth aspect, this application provides a first communication apparatus, configured to perform the method according to any one of the first aspect or the possible implementations of the first aspect.

The first communication apparatus includes corresponding units configured to perform the method according to any one of the first aspect or the possible implementations of the first aspect. For example, the first communication apparatus may include a transceiver unit and a processing unit. The first communication apparatus may be the first core network device in the first aspect.

According to a fifth aspect, this application provides a second communication apparatus, configured to perform the method according to any one of the second aspect or the possible implementations of the second aspect.

The second communication apparatus includes corresponding units configured to perform the method according to any one of the second aspect or the possible implementations of the second aspect. For example, the second communication apparatus may include a transceiver unit and a processing unit. The second communication apparatus may be the second core network device in the second aspect.

According to a sixth aspect, this application provides a third communication apparatus, configured to perform the method according to any one of the third aspect or the possible implementations of the third aspect.

The third communication apparatus includes corresponding units configured to perform the method according to any one of the third aspect or the possible implementations of the third aspect. For example, the third communication apparatus may include a transceiver unit and a processing unit. The third communication apparatus may be the terminal device in the third aspect.

According to a seventh aspect, this application provides a first communication apparatus. The first communication apparatus includes a processor, configured to perform the method according to any one of the first aspect or the possible implementations of the first aspect.

In a process of performing the foregoing methods, a process of sending information and a process of receiving the information in the foregoing methods may be understood as a process of outputting the information by the processor and a process of receiving the input information by the processor. When outputting the information, the processor outputs the information to a transceiver, so that the transceiver transmits the information. After the information is output by the processor, other processing may further need to be performed on the information before the information arrives at the transceiver. Similarly, when the processor receives the foregoing input information, the transceiver receives the foregoing information, and inputs the foregoing information into the processor. Further, after the transceiver receives the foregoing information, other processing may need to be performed on the foregoing information before the information is input into the processor.

Based on the foregoing principle, for example, sending a request (for example, a second request) in the foregoing methods may be understood as outputting the request by the processor. For another example, receiving a request (for example, a first request) may be understood as receiving an input request by the processor.

Unless otherwise specified, if operations such as transmission, sending, and receiving related to the processor do not conflict with actual functions or internal logic of the operations in related descriptions, the operations may be more generally understood as operations such as output, receiving, and input of the processor rather than transmission, sending, and receiving operations directly performed by a radio frequency circuit and an antenna.

In an implementation process, the processor may be a processor specially configured to perform these methods, or a processor, for example, a general-purpose processor, that executes computer instructions in a memory to perform these methods. The memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application. It may be understood that the descriptions of the processor in this application are applicable to both the eighth aspect and the ninth aspect shown below. To avoid repetition, details are not described below again.

In some embodiments, the memory is located outside the first communication apparatus.

In some embodiments, the memory is located inside the first communication apparatus.

In this application, the processor and the memory may alternatively be integrated in one device, that is, the processor and the memory may be integrated together.

In some embodiments, the first communication apparatus further includes the transceiver, and the transceiver is configured to receive a signal and/or send a signal.

For example, the transceiver may be configured to receive the first request and a second response. For another example, the transceiver may be further configured to send the first request and a first response.

In some embodiments, the first communication apparatus may be the first core network device in the first aspect.

According to an eighth aspect, this application provides a second communication apparatus. The second communication apparatus includes a processor, configured to execute a computer program stored in a memory. When the computer program is executed, the second communication apparatus is enabled to perform the method according to any one of the second aspect or the possible implementations of the second aspect.

In some embodiments, the memory is located outside the second communication apparatus.

In some embodiments, the memory is located inside the second communication apparatus.

In this application, the processor and the memory may alternatively be integrated in one device, that is, the processor and the memory may be integrated together.

In some embodiments, the second communication apparatus further includes a transceiver, and the transceiver is configured to receive a signal and/or send a signal. For example, the transceiver may be configured to receive a second request. For another example, the transceiver may be further configured to send a second response.

In some embodiments, the second communication apparatus may be the second core network device in the second aspect.

According to a ninth aspect, this application provides a third communication apparatus. The third communication apparatus includes a processor, configured to execute a computer program stored in a memory. When the computer program is executed, the third communication apparatus is enabled to perform the method according to any one of the third aspect or the possible implementations of the third aspect.

In some embodiments, the memory is located outside the third communication apparatus.

In some embodiments, the memory is located inside the third communication apparatus.

In this application, the processor and the memory may alternatively be integrated in one device, that is, the processor and the memory may be integrated together.

In some embodiments, the third communication apparatus further includes a transceiver, and the transceiver is configured to receive a signal and/or send a signal. For example, the transceiver may be configured to send a seventh request. For another example, the transceiver may be further configured to receive a seventh response.

In some embodiments, the third communication apparatus may be the terminal device in the third aspect.

According to a tenth aspect, this application provides a first communication apparatus. The first communication apparatus includes a logic circuit and an interface. The logic circuit is coupled to the interface; the interface is configured to input a first request and output a second request, and is further configured to input a second response and output a first response; and the logic circuit is configured to establish a session based on the first response.

That the interface inputs the first request and outputs the second request may also be understood as that the logic circuit controls the interface to input the first request and output the second request, and the like. This is not limited in this application.

In some embodiments, the interface is further configured to output a third request and input a third response.

In some embodiments, the interface is specifically configured to output a fourth request and input a fourth response.

In some embodiments, the interface is further configured to input a fifth request and output a sixth response; and the interface is further configured to input the sixth request and output a fifth response.

It may be understood that for specific functions of the first request, an identifier of a terminal device, the first communication apparatus, and a second communication apparatus, refer to the descriptions in the first aspect or the second aspect. Details are not described herein again.

According to an eleventh aspect, this application provides a second communication apparatus. The second communication apparatus includes a logic circuit and an interface. The logic circuit is coupled to the interface, and is configured to control the interface to input a second request and output a second response.

It may be understood that, for specific functions of the second request, the second response, an identifier of a terminal device, a first communication apparatus, and the second communication apparatus, refer to the descriptions in the first aspect or the second aspect. Details are not described herein again.

According to a twelfth aspect, this application provides a third communication apparatus. The third communication apparatus includes a logic circuit and an interface. The logic circuit is coupled to the interface and is configured to obtain an identifier of a second communication apparatus corresponding to the third communication apparatus; the interface is configured to output a seventh request and input a seventh response; and the logic circuit is further configured to perform a session based on the seventh response.

That the logic circuit performs the session may also be understood as that the logic circuit performs the session through the interface, and the like. This is not limited in this application.

It may be understood that for descriptions of the seventh request, an identifier of the terminal device, and the like, refer to the first aspect or the second aspect. Details are not described herein again.

According to a thirteenth aspect, this application provides a communication system. The communication system includes a first communication apparatus and a second communication apparatus. The first communication apparatus may be configured to perform the method according to any one of the first aspect or the possible implementations of the first aspect. The second communication apparatus may be configured to perform the method according to any one of the second aspect or the possible implementations of the second aspect.

It may be understood that the first communication apparatus may be the foregoing first core network device, and the second communication apparatus may be the foregoing second core network device.

According to a fourteenth aspect, this application provides a computer-readable storage medium. The computer-readable storage medium is configured to store a computer program. When the computer program is run on a computer, the method according to any one of the first aspect or the possible implementations of the first aspect is performed.

According to a fifteenth aspect, this application provides a computer-readable storage medium. The computer-readable storage medium is configured to store a computer program. When the computer program is run on a computer, the method according to any one of the second aspect or the possible implementations of the second aspect is performed.

According to a sixteenth aspect, this application provides a computer-readable storage medium. The computer-readable storage medium is configured to store a computer program. When the computer program is run on a computer, the method according to any one of the third aspect or the possible implementations of the third aspect is performed.

According to a seventeenth aspect, this application provides a computer program product. The computer program product includes a computer program or computer code. When the computer program product runs on a computer, the method according to any one of the first aspect or the possible implementations of the first aspect is performed.

According to an eighteenth aspect, this application provides a computer program product. The computer program product includes a computer program or computer code. When the computer program product runs on a computer, the method according to any one of the second aspect or the possible implementations of the second aspect is performed.

According to a nineteenth aspect, this application provides a computer program product. The computer program product includes a computer program or computer code. When the computer program product runs on a computer, the method according to any one of the third aspect or the possible implementations of the third aspect is performed.

According to a twentieth aspect, this application provides a computer program. When the computer program is run on a computer, the method according to any one of the first aspect or the possible implementations of the first aspect is performed.

According to a twenty-first aspect, this application provides a computer program. When the computer program is run on a computer, the method according to any one of the second aspect or the possible implementations of the second aspect is performed.

According to a twenty-second aspect, this application provides a computer program. When the computer program is run on a computer, the method according to any one of the third aspect or the possible implementations of the third aspect is performed.

According to a twenty-third aspect, this application provides a communication system. The communication system includes a first core network device and a second core network device. The first core network device is configured to perform the method according to any one of the first aspect or the possible implementations of the first aspect, and the second core network device is configured to perform the method according to any one of the second aspect or the possible implementations of the second aspect.

DETAILED DESCRIPTION

Figure 1:
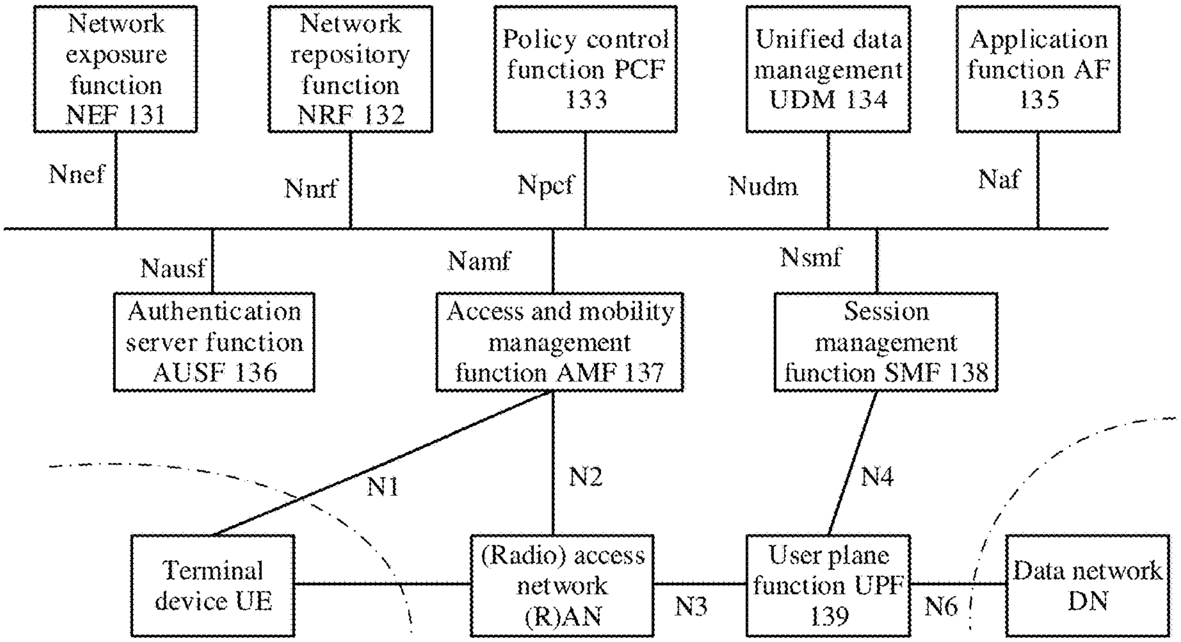
FIG. 1 is a schematic diagram of a network architecture according to an embodiment of this application.

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but In some embodiments further includes an unlisted step or unit, or In some embodiments further includes another step or unit inherent to the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (items)" means two, three, or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "I" usually indicates an "or" relationship between associated objects. "At least one of the following items (pieces)" or a similar expression thereof means any combination of these items. For example, at least one (piece) of a, b, or c may represent: a, b, c, "a and b", "a and c", "b and c", or "a, b, and c".

The technical solutions provided in this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a narrow band-Internet of things (NB-IoT) system, a $5^{th}$ generation (5G) communication system or a new radio (NR) system, and another future communication system.

The following describes terms in this application in detail.

1. Terminal Device

The terminal device in this application is an apparatus with a wireless transceiver function. The terminal device may communicate with one or more core network (CN) devices (or may be referred to as core devices) through an access network device (or may be referred to as an access device) in a radio access network (RAN).

The terminal device may also be referred to as user equipment (UE), an access terminal, a terminal, a subscriber unit, a user station, a mobile site, a mobile station, a remote station, a remote terminal, a mobile device, a user terminal, a user agent, a user apparatus, or the like. In some embodiments, the terminal device may be deployed on land, including an indoor device, an outdoor device, a handheld device, or a vehicle-mounted device, may be deployed on a water surface (for example, on a ship), or may be deployed in the air (for example, on an airplane, a balloon, or a satellite). In some embodiments, the terminal device may be a handheld device, a vehicle-mounted device, a wearable device, a terminal in the Internet of things, a terminal in the Internet of vehicles, a terminal device in any form in a $5^{th}$ generation (5G) network or a future network, or the like, which has a wireless communication function. This is not limited in this application.

It may be understood that terminal devices in this application may communicate with each other by using a technology, for example, a device to device (D2D) technology, a vehicle-to-everything (V2X) technology, or a machine to machine (M2M) technology. A method for communication between the terminal devices is not limited in this application.

2. Access Network Device

The access network device in this application may be an apparatus deployed in a radio access network to provide a wireless communication service for a terminal device. The access network device may also be referred to as an access device, an \ise AN device, or the like.

The access network device may include but is not limited to: a next generation node base station (gNB) in a 5G system, an evolved NodeB (eNB) in an LTE system, a radio network controller (RNC), a NodeB (NB), a base station controller (BSC), a base transceiver station (BTS), a home NodeB (home evolved NodeB or home NodeB, HNB), a baseband unit (BBU), a transmitting and receiving point (TRP), a transmitting point (TP), a small base station device (pico), a mobile switching center, or a network device in a future network. The access network device may alternatively be, for example, a device that carries a base station function in D2D, V2X, or M2M. A specific type of the access network device is not limited in this application. In systems using different radio access technologies, devices with a function of the access network device may have different names.

In some embodiments, in some deployments of the access network device, the access network device may include a central unit (CU), a distributed unit (DU), and the like. In some other deployments of the access network device, the CU may be further divided into a CU control plane (CP), a CU-user plane (UP), and the like. In some other deployments of the access network device, the access network device may alternatively have an open radio access network (ORAN) architecture or the like. A specific deployment manner of the access network device is not limited in this application.

3. Core Network Device

The core network device in this application may be an apparatus, a software system, or the like deployed in a wireless network. The core network device may provide a terminal device connection, manage a terminal device, and complete service carrying, and serves as a bearer network to provide an interface to an external network, for example, the Internet. In systems using different radio access technologies, devices having a core network function may have different names and different network functions. For example, as shown in FIG. 1, a 5G core network (5GC) may include a network exposure function (NEF) 131, a network repository function (NRF) 132, a policy control function (PCF) 133, a unified data management (UDM) function 134, an application function (AF) 135, an authentication server function (AUSF) 136, an access and mobility management function (AMF) 137, a session management function (SMF) 138, a user plane function (UPF) 139, a (radio) access network ((R)AN) 140, and the like.

For example, the AMF is a control plane network function provided by a carrier network, and is responsible for access control and mobility management for accessing the carrier network by the terminal device, for example, including functions such as mobility status management, temporary user identity assignment, and user authentication and authorization. The session management function SMF is a control plane network function provided by the carrier network, and is responsible for managing a protocol data unit (PDU) session of the terminal device. It may be understood that for specific functions of the functions or network elements, refer to related protocols, standards, or the like. Details are not described in this application.

However, in this application, the core network may include a network-level core network and a user-level core network. The network-level core network may be configured to execute a network capability, and execute a network policy (which may also be understood as executing a policy of a carrier). The user-level core network may be configured to store related data and a policy of a user, and execute a user policy (which may also be understood as executing a policy of a terminal device). In addition, the user-level core network may be controlled by the user and may be configured to manage the user, including user data, a policy configuration, a service, an application, and the like. It may be understood that the user described in this application may also be understood as a terminal device or the like. In other words, the user described in this application may also be understood as a terminal device or the like from"a "core network perspect"ve".

Figure 2A:
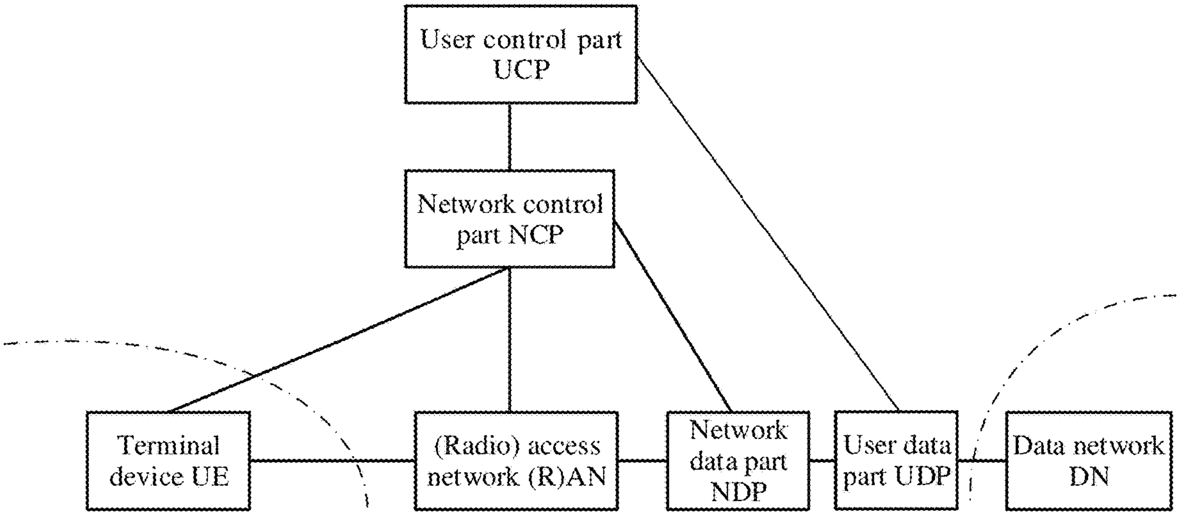
FIG. 2*a* and FIG. 2*b* are schematic diagrams of another network architecture according to an embodiment of this application.
Figure 2B:
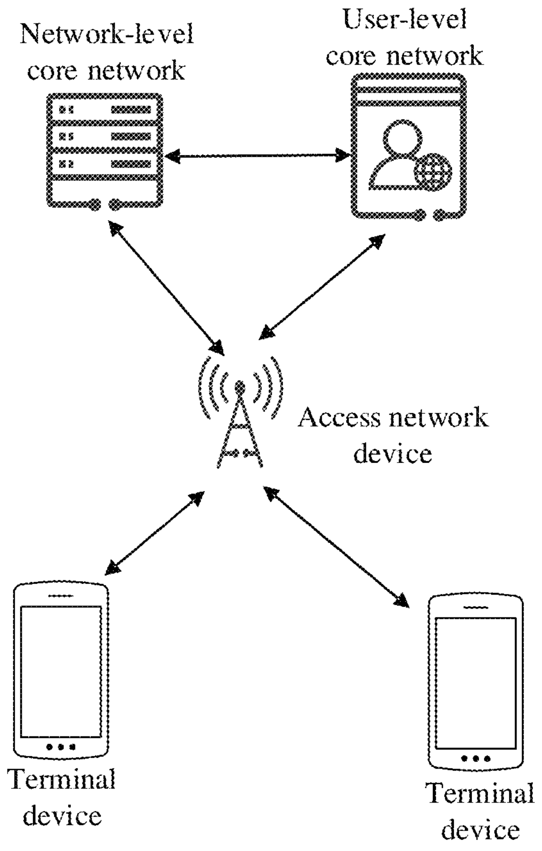

For specific architecture deployments of the network-level core network and the user-level core network described in this application, refer to FIG. 2*a* and FIG. 2*b*. As shown in FIG. 2*a* and FIG. 2*b*, a terminal device may communicate with a network-level core network and/or a user-level core network through an access network device in a radio access network. The network-level core network may include a first core network device, and the user-level core network may include a second core network device. In this application, the first core network device may be further understood as a network control part (NCP), and the second core network device may be further understood as a user control part (UCP).

It may be understood that, when the terminal device roams, the network-level core network may include a first core network device in a home location and a first core network device in a visited location, but the user-level core network, for example, the second core network device, serving the terminal device is still deployed in the home location. In some embodiments, when the user-level core network, for example, the second core network device, is deployed in an untrusted domain or a weak trusted domain of a carrier, that is, when the second core network device is deployed outside a trusted domain of the carrier, a firewall may be shared between the first core network device and the second core network device to ensure network security.

The following describes in detail functions of the first core network device and the second core network device in this application.

The first core network device is a control plane unit of the network-level core network. The first core network device may be configured to implement a network policy of the carrier, and maintain a mapping relationship between an identifier of the terminal device and the second core network device. In addition, the first core network device and the second core network device may further jointly complete network access authentication, session request authentication, user session forwarding, and the like on the terminal device. For example, the first core network device may be configured to provide a control plane network function, and the control plane network function includes any one or more of the following functions: access management, session management, mobility management, policy management, charging management, authentication management, and the like. That is, the first core network device in this application may be configured to implement any one or more of the following functions: session management, policy management, charging management, or authentication management, and may further be configured to implement an access and mobility management function. In other words, the first core network device shown in this application may be responsible for access control and mobility management for the terminal device to access a carrier network, and may further manage session configuration and the like of the terminal device. In addition, the first core network device may be further configured to implement management of policies. For example, the policies may include a charging related policy, a quality of service (QoS) related policy, an authorization related policy, and the like.

The policy management of the first core network device may refer to a capability of the first core network device to store, detect, and implement a policy. In some service processes, for example, service processes such as network access, session establishment, mobility, and roaming of the terminal device may specifically refer to signaling processes in the foregoing service processes. For example, the first core network device stores a policy set by the carrier, and detects and implements the policy set by the carrier for a specific signaling process. For specific descriptions of the session management implemented by the first core network device, refer to the following method shown in FIG. 5. For specific descriptions of the authentication management implemented by the first core network device, refer to the following method shown in FIG. 6.

The second core network device is a control plane unit of the user-level core network. The second core network device may be used to implement a network policy of the terminal device, and perform network access authentication, session request authentication, user session forwarding, and the like based on data and a configuration policy of the terminal device. For example, the second core network device may be configured to provide a control plane function, and the control plane function includes any one or more of the following functions: subscriber data management, access management, user policy management, charging management, user application management, session management, and the like. The policy management of the second core network device may be a capability of the second core network device to store, detect, and implement a policy. In some service processes, for example, service processes such as network access, session establishment, mobility, and roaming of the terminal device may specifically refer to signaling processes in the foregoing service processes. For example, the second core network needs to store a policy set by a user (namely, a terminal device), and detects and implements the policy set by the user for a specific signaling process.

It may be understood that the policy in this application may specifically refer to a session policy, a subscription policy, an access control policy, a blacklist/whitelist policy, a data routing policy, a roaming policy, another policy customized by a network carrier or a user, or the like. A specific policy type is not limited in this application.

In some embodiments, the network-level core network may further include a fourth core network device, and the user-level core network may further include a third core network device. The fourth core network device may also be understood as a network data part (NDP), and the third core network device may also be understood as a user data part (UDP). The following describes in detail functions of the third core network device and the fourth core network device in this application.

The third core network device is a data plane unit of the user-level core network. The third core network device may be configured to implement user-level data exchange, forwarding, policy execution, or the like from a dimension of the terminal device. For example, the third core network device may be configured to perform functions such as a user data gateway and a firewall. For example, the third core network device may be further configured to configure session related user-level configuration such as configuration of user context information.

The fourth core network device is a data plane unit of the network-level core network. The fourth core network device may implement network-level data exchange, forwarding, policy execution, or the like from a network-level dimension. For example, the fourth core network device may be configured to perform a data gateway, a firewall, network address translation (NAT), or lawful interception. For example, the fourth core network device may be further configured to configure a session related network-level configuration such as a session type configuration or a protocol configuration. For example, the fourth core network device may be further configured to configure an IP address for the terminal device.

In some embodiments, the user-level core network may further include a user application (U-App). The user application may be configured to perform an application related function and the like executed by the terminal device. The user application is an application logic unit of the user-level core network. The user application may be installed and managed by the user, and provides an application service for the user, for example, application-level functions such as specific content filtering, blacklist and whitelist access control, game acceleration, and hypertext transfer protocol (HTTP) proxy.

With reference to the method shown in FIG. 5 or FIG. 6 in the following, the following more vividly describes functions of the first core network device (namely, the NCP), the second core network device (namely, the UCP), the third core network device (namely, the UDP), and the fourth core network device (namely, the NDP) in this application.

NCP: In a network access or session establishment process of the terminal device, the NCP determines the UDP corresponding to the terminal device, sends a related message (for example, a second request) to the UCP, and processes a corresponding message (for example, a second response) returned by the UCP.

NDP: The NDP may be understood as a UPF or a user plane gateway function in another form, for example, an IP gateway function. The NDP may be used as a data anchor of the terminal device in the network-level core network. For example, the NDP establishes a data tunnel between the access network device and the NDP by receiving a related message (for example, a fourth request) sent by the NCP. The data tunnel between the access network device and the NDP is established, so that the terminal device can send data, signaling, and/or the like to the NDP through the access network device, and the NDP implements data routing. For another example, the NDP may further support a lawful interception standard or another related function.

UCP: The UCP controls and implements a user-level policy based on a user setting. For example, the UCP forwards data indicating a specific session to a corresponding U-App based on a routing policy set by the user.

UDP: The UDP may be understood as a UPF or a user plane gateway function in another form, for example, an IP gateway function. The NDP may be used as a data anchor of the terminal device in the user-level core network. For example, the UDP establishes a data tunnel between the NDP and the UDP by receiving a related message (for example, a third request) sent by the NCP. The data tunnel between the NDP and the UDP is established, so that the terminal device can send data, signaling, and/or the like to the UDP through the access network device or the NDP, and the UDP implements routing.

The specific functions of the NCP, NDP, UCP, and UDP described herein are merely examples, and the functions described herein are also applicable to the following.

The following describes system architectures provided in this application with reference to the foregoing devices.

Figure 3A:
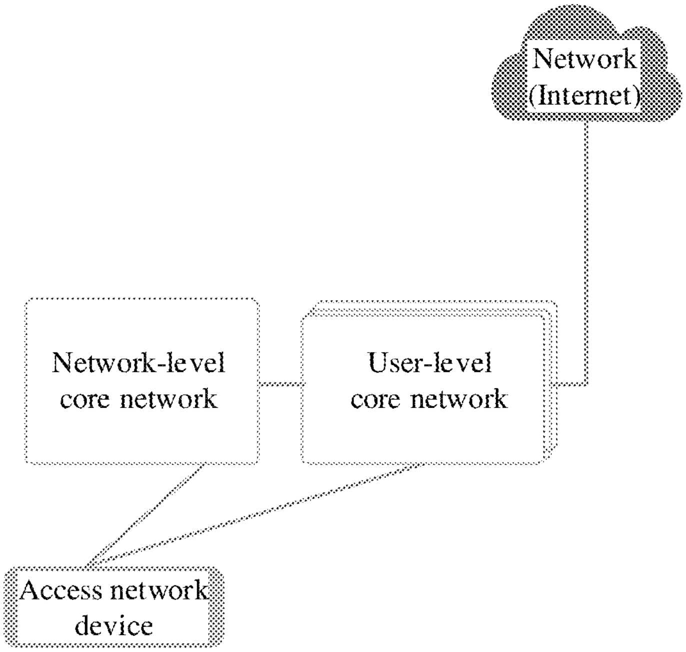
FIG. 3*a* to FIG. 3*e* are schematic diagrams of still another network architecture according to an embodiment of this application.

FIG. 3*a* is a schematic diagram of a network architecture according to an embodiment of this application. As shown in FIG. 3*a*, a plurality of user-level core networks may be deployed in a network. Further, with reference to FIG. 3*b* and FIG. 3*d*, a network-level core network includes an NCP and an NDP, and the user-level core network includes a UDP, a UCP, and a U-App.

In this embodiment of this application, a correspondence between an identifier of a terminal device and an identifier of the UCP may be fixed. In some embodiments, the correspondence between the identifier of the terminal device and the identifier of the UCP may be stored in subscription information of the terminal device. In another possible implementation, the correspondence between the identifier of the terminal device and the identifier of the UCP may be stored in a first database. The first database may be a database corresponding to the user-level core network. For example, the first database may be set in each UCP. Alternatively, a plurality of UCPs share the first database. This is not limited in this embodiment of this application. It may be understood that the manner, described herein, of storing the correspondence between the identifier of the terminal device and the identifier of the UCP is merely an example. In a specific implementation, there may be another manner. Details are not described herein again.

In some embodiments, the correspondence between the identifier of the terminal device and the identifier of the UDP may be fixed. Therefore, management by a carrier is convenient, and a management manner is simple. In some embodiments, the correspondence between the identifier of the terminal device and the identifier of the UDP may be updated, so that the management manner of the carrier is more flexible. In other words, the correspondence between the identifier of the terminal device and the identifier of the UDP may have a validity period, and the validity period may be permanent or temporary. For example, the validity period of the correspondence between the identifier of the terminal device and the identifier of the UDP is preset duration, and the preset duration is used to measure a time length of the validity period. A specific value of the preset duration is not limited in this embodiment of this application. For another example, the validity period of the correspondence between the identifier of the terminal device and the identifier of the UDP is a preset period of time, and the preset period of time is used to indicate a start time and an end time of the validity period. A specific value of the preset period of time is not limited in this embodiment of this application. It may be understood that the specific representation manners of the validity period are merely examples, and should not be understood as a limitation on this embodiment of this application.

Figure 3B:
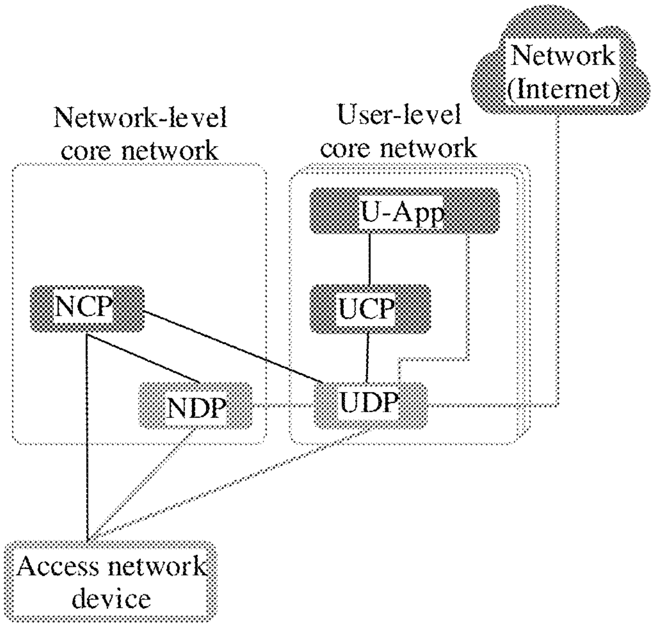

In FIG. 3*b*, the network-level core network not only includes the NCP, but also includes the NDP; and the user-level core network not only includes the UCP, but also includes the UDP and the U-App. However, in FIG. 3*c* and FIG. 3*e*, the network-level core network may include only the NCP, and the user-level core network may include the UCP, the UDP, and the U-App. In other words, in this application, in some implementations, both the NDP and the UDP may participate in a session establishment process of the terminal device. In some other implementations, only the UDP participates in the session establishment process of the terminal device.

Figure 3C:
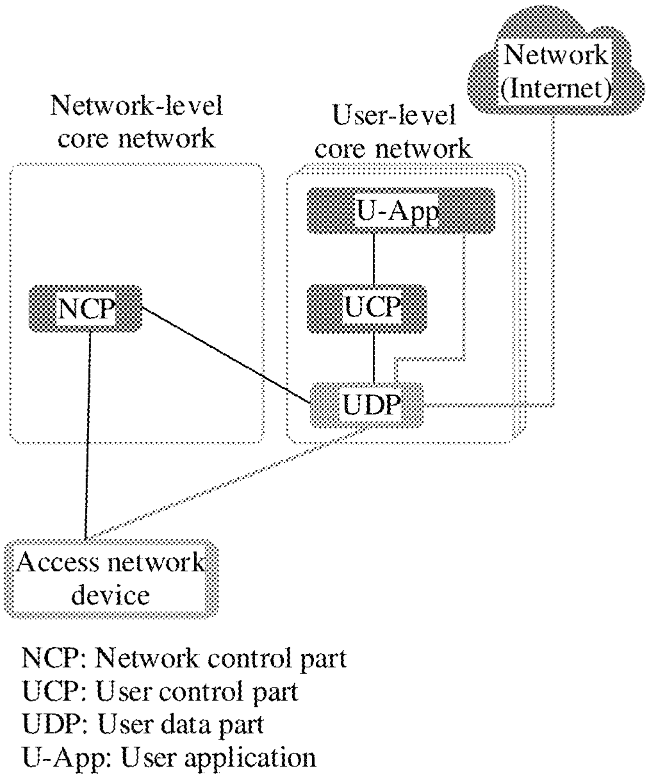
Figure 3D:
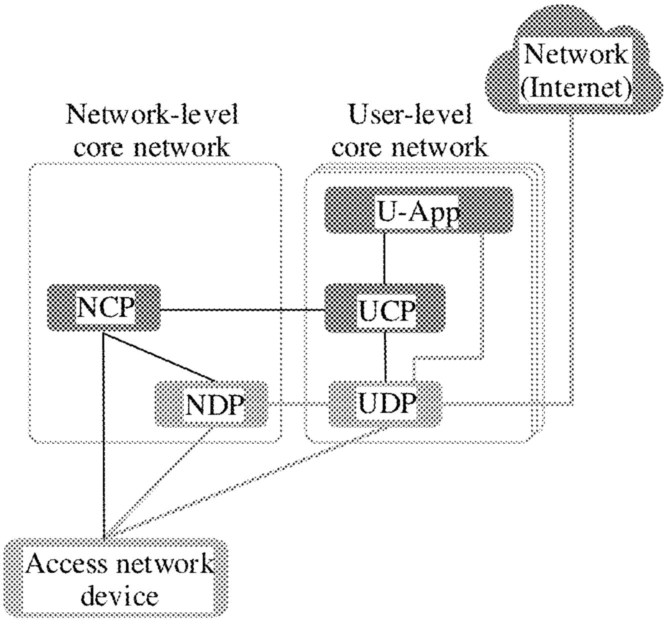
Figure 3E:
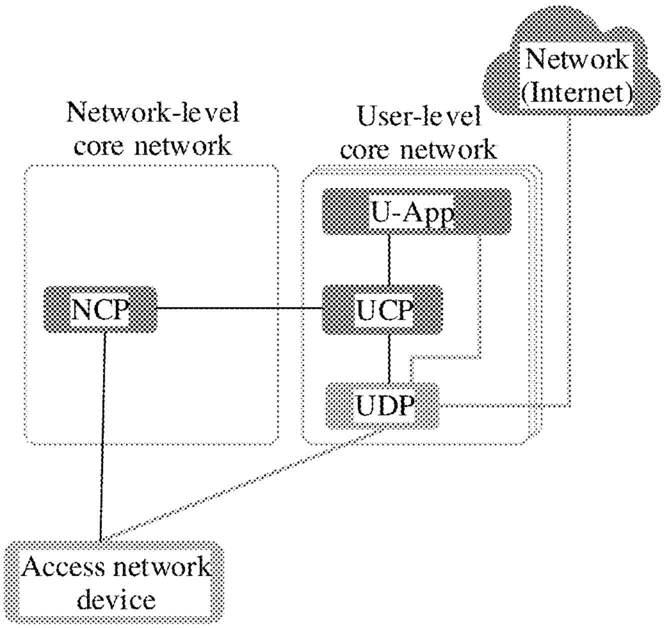

In an implementation, in the network architectures shown in FIG. 3*b* and FIG. 3*c*, the NCP may directly exchange data and/or signaling with the UDP. FIG. 5 and FIG. 6 shown below show an example in which an NCP (namely, a first core network device) directly exchanges data and/or signaling with a UDP (namely, a third core network device). This implementation is simple to implement. In another implementation, in the network architectures shown in FIG. 3*d* and FIG. 3*e*, in the session establishment method shown in this application, the NCP may further exchange data and/or signaling with the UDP through a UCP (namely, a second core network device). Because a received request may be authenticated separately by the UCP, the UDP, and the like, this implementation can improve security of data and/or signaling exchange. For example, the NCP may send a second request to the UCP through the UDP, and the UCP may send a second response to the NCP through the UDP.

It may be understood that the network architectures shown in FIG. 3*b* to FIG. 3*e* are merely examples. In a specific implementation, the network architectures may be in other forms. This is not limited in this application.

Figure 4A:
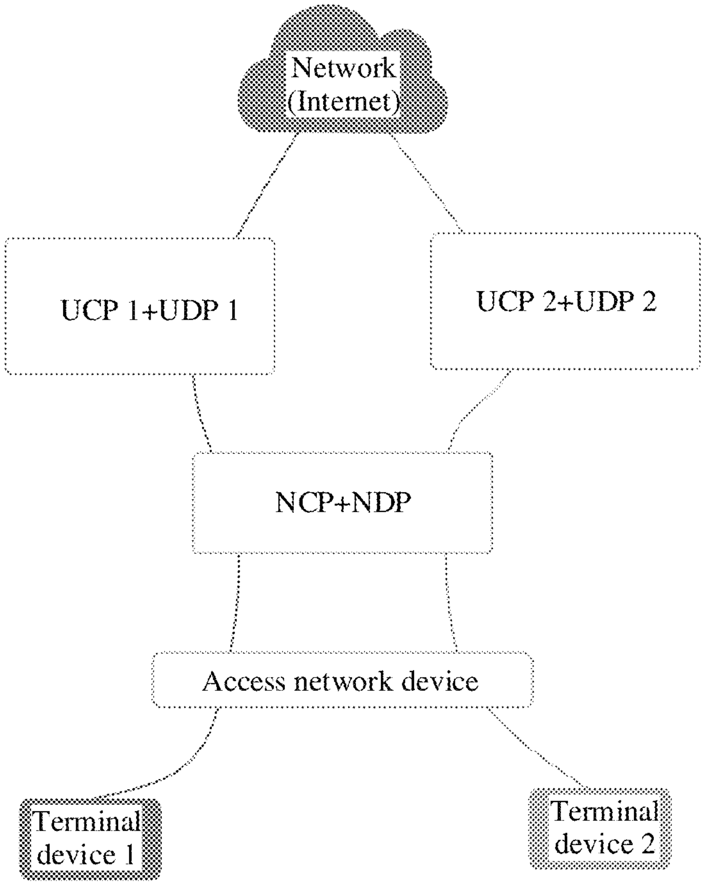
FIG. 4*a* to FIG. 4*c* are schematic diagrams of still another network architecture according to an embodiment of this application.
Figure 4B:
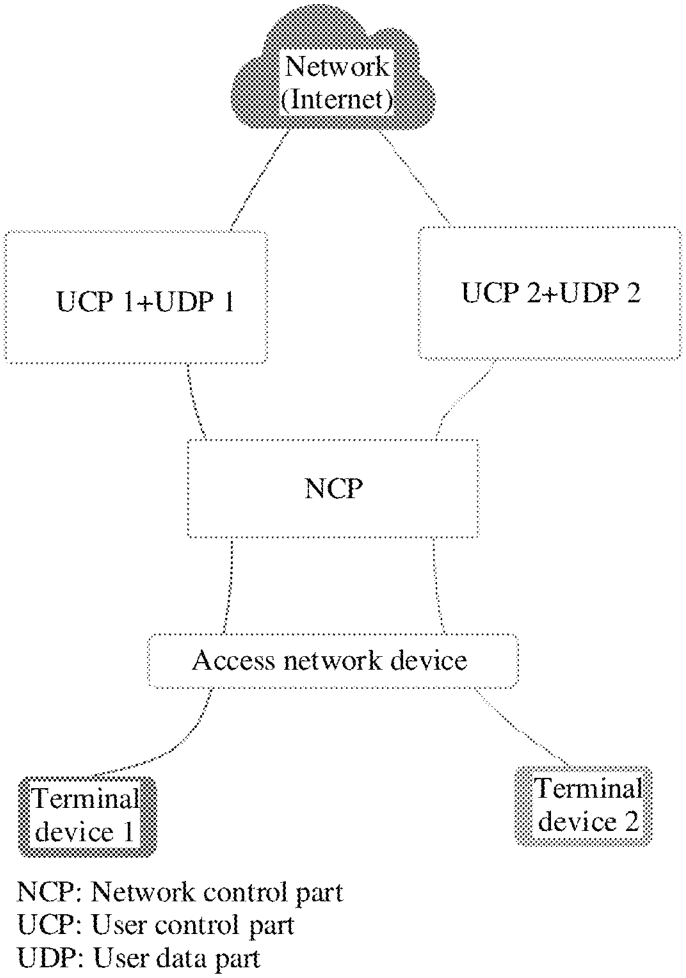

With reference to FIG. 4*a* and FIG. 4*b*, the user-level core network may serve a specified terminal device. For example, a UCP 1 and a UDP 1 may serve a terminal device 1, and a UCP 2 and a UDP 2 may serve a terminal device 2. In other words, the terminal device 1 may communicate with the UCP 1 through an access network device and an NCP, and the terminal device 2 may communicate with the UCP 2 through the access network device and the NCP. For descriptions that FIG. 4*a* includes an NDP but FIG. 4*b* does not include an NDP, refer to the foregoing descriptions. Details are not described herein again. It may be understood that descriptions herein about a correspondence between a user-level core network and a terminal device are also applicable to the following.

Figure 4C:
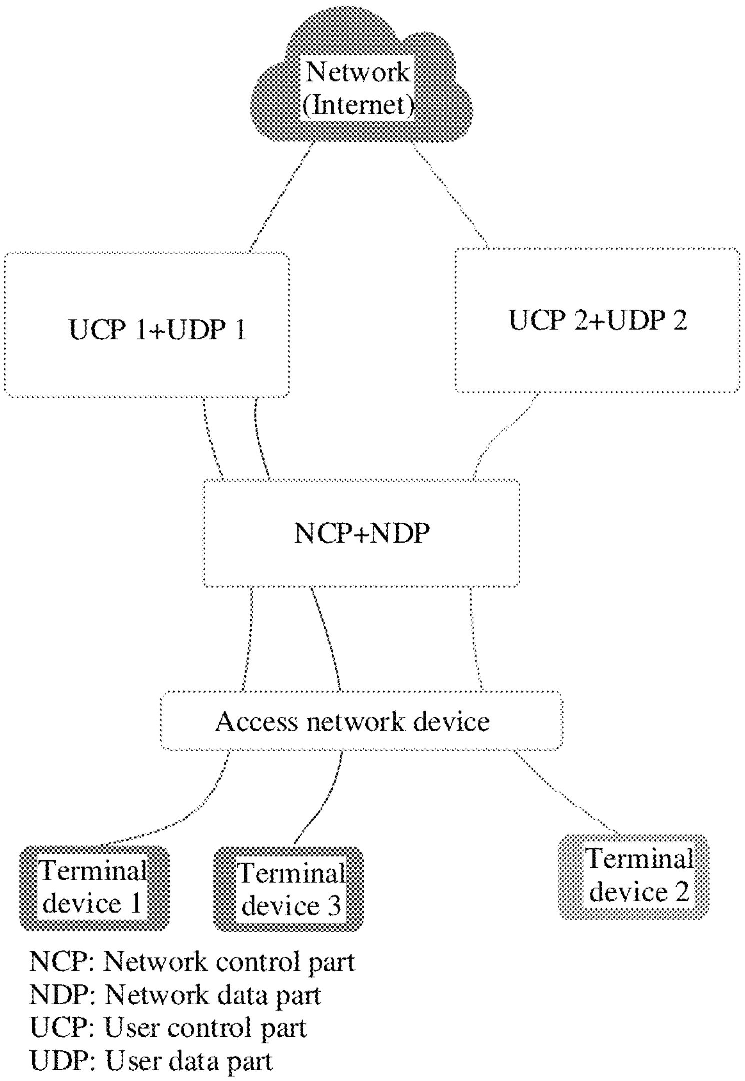

With reference to FIG. 4*c*, the user-level core network may further serve one or more specified terminal devices. For example, the UCP 1 and the UDP 1 may serve the terminal device 1 and a terminal device 3.

The network architectures shown above have respective focuses. For an implementation that is not described in detail in one architecture, refer to descriptions of another architecture. Details are not described herein again.

Based on the network architecture shown in FIG. 1, when the terminal device needs to establish a session, network elements that need to participate include not only an (R)AN, but also an AMF, an SMF, a UPF, a PCF, a UDM, and the like. In this implementation, the manner of establishing the session is complex, and user data and the like are shared by a plurality of network elements. This affects security and privacy of the user.

In view of this, this application provides a session establishment method. A session establishment process is simpler, and security and privacy of the user can be ensured. It may be understood that, in the following embodiments, for specific descriptions of the first core network device, the second core network device, the third core network device, the fourth core network device, the access network device, the terminal device, and the like, refer to the foregoing descriptions. Details are not described below again.

Figure 5:
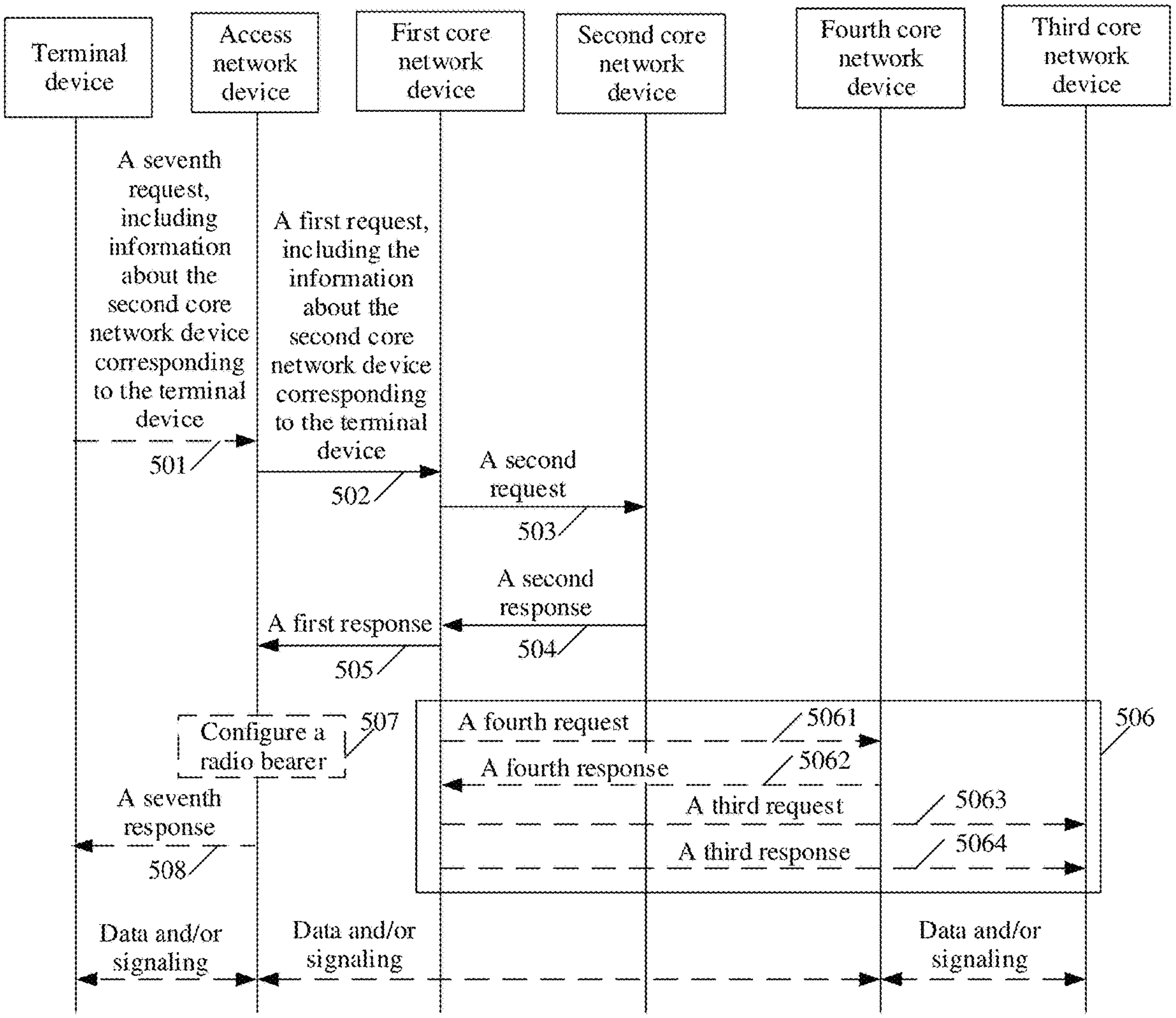
FIG. 5 is a schematic flowchart of a session establishment method according to an embodiment of this application.

FIG. 5 is a schematic flowchart of a session establishment method according to an embodiment of this application. As shown in FIG. 5, the method includes the following steps.

In some embodiments, the method shown in FIG. 5 includes step 501.

501: A terminal device sends a seventh request to an access network device, where the seventh request is used to request to establish a session of the terminal device, and the seventh request includes information about a second core network device corresponding to the terminal device. Correspondingly, the access network device receives the seventh request.

For the information about the second core network device corresponding to the terminal device, refer to related descriptions in step 502.

For example, the terminal device may learn an identifier of the second core network device in following manners:

In a first manner, the identifier of the second core network device is stored in subscription information of the terminal device.

In a second manner, the terminal device obtains the identifier of the second core network device during network access authentication. For a specific implementation of the second manner, refer to FIG. 6 in the following. Details are not described herein again.

It may be understood that the manners in which the terminal device learns the identifier of the second core network device are merely examples. In a specific implementation, the terminal device may alternatively learn the identifier of the second core network device in another manner. This is not limited in this embodiment of this application.

502: The access network device sends a first request to a first core network device. Correspondingly, the first core network device receives the first request from the access network device, where the first request is used to request to establish a session (session) of the terminal device, and the first request includes the information about the second core network device corresponding to the terminal device.

The first request may also be understood as a session request (session request), a session establishment request (session establishment request), or the like. The session of the terminal device may include any one or more of a session between the terminal device and a network, a session between terminal devices (for example, a D2D or M2M communication manner), or a session between the terminal device and an application server. In addition, the session herein may include a user plane session and/or a control plane session.

The information about the second core network device corresponding to the terminal device may include an identifier of the terminal device, and the identifier of the terminal device is associated with the identifier of the second core network device. Alternatively, the information about the second core network device corresponding to the terminal device includes the identifier of the second core network device. For example, the identifier of the terminal device may include any one or more of the following: a subscription concealed identifier (SUCI), a globally unique temporary UE identity (globally unique temporary UE identity, GUTI), a generic public subscription identifier (GPSI), a subscriber permanent identifier (SUPI), an international mobile station identity (IMSI), a temporary mobile subscriber identity (TMSI), a packet temporary mobile subscriber identity (PTMSI), a mobile station international subscriber directory number (MSISDN), and the like. It may be understood that the foregoing identifier of the terminal device is merely an example. In a specific implementation, the identifier of the terminal device may alternatively be in another form. Details are not described herein again. The identifier of the second core network device may include any one or more of the following: an IP address, a domain name identifier, or a host name. In other words, the identifier of the second core network device may be any identifier that can address the second core network device. A specific type of the identifier of the second core network device is not limited in this embodiment of this application.

The second core network device may correspond to the terminal device, or the second core network device may correspond to a plurality of terminal devices including the terminal device. For a description of a correspondence between the terminal device and the second core network device, refer to the foregoing descriptions. Details are not described herein again. For example, as shown in FIG. 4*c*, in some implementations, the UCP 1 may serve the terminal device 1 and the terminal device 3. In some other implementations, the UCP 2 may serve the terminal device 2. That is, the second core network device serves one or more terminal devices.

In some implementations, when the access network device receives the seventh request, the access network device may transparently transmit the seventh request. In this case, the first request is the seventh request.

In some other implementations, when receiving the seventh request, the access network device may further obtain the first request based on the seventh request. For example, the access network device may decapsulate the seventh request to obtain content in the seventh request. Then, the access network device obtains the first request through encapsulation based on content in the seventh request.

It may be understood that, the descriptions of the first request and the seventh request are also applicable to a first request, a second request, a first response, a second response, a fifth request, a sixth request, a sixth response, a fifth response, and the like that are described below. To avoid repetition, details are not described below again.

503: The first core network device sends a second request to the second core network device according to the first request. Correspondingly, the second core network device receives the second request.

That the first core network device sends a second request to the second core network device according to the first request may be understood as the following two manners:

Manner 1: The first core network device sends, based on the identifier of the terminal device, the second request to the second core network device corresponding to the terminal device.

Manner 2: The first core network device sends the second request to the second core network device based on the identifier of the second core network device.

For example, if the first request includes the identifier of the second core network device, the first core network device may directly send the second request to the second core network device based on the identifier of the second core network device. For example, if the first request includes the identifier of the terminal device, the first core network device may further determine, based on a correspondence between the identifier of the terminal device and the identifier of the second core network device, the identifier of the second core network device that corresponds to the identifier of the terminal device included in the first request.

The correspondence between the identifier of the terminal device and the identifier of the second core network device may be directly stored in the first core network device, or may be stored in a first database. An implementation in which the correspondence between the identifier of the terminal device and the identifier of the second core network device is stored in the first core network device is not described in detail herein, and an implementation in which the correspondence is stored in the first database is mainly described. The first database may be understood as a database of the second core network device corresponding to the terminal device, or may be understood as a database of a plurality of second core network devices, or the like. This embodiment of this application imposes no limitation on which second core network devices the first database is specifically a database of. For example, the first database may be understood as a database managed by a carrier, and the first database may store information about a plurality of second core network devices. Therefore, before step 503, the method shown in FIG. 5 may further include: The first core network device determines the identifier of the second core network device based on the identifier of the terminal device. For example, the first core network device sends a query request to the first database, where the query request includes the identifier of the terminal device; and the first core network device receives a query response, where the query response includes the identifier of the second core network device corresponding to the terminal device.

It may be understood that, for a function of the second request, refer to the function of the first request above. Details are not described herein again.

In some embodiments, that the first core network device sends a second request to the second core network device according to the first request includes:

When the first request is valid, the first core network device sends the second request to the second core network device according to the first request.

The first request being valid may be understood as, for example, a case in which the first core network device authenticates the terminal device according to the first request and the authentication succeeds. In other words, when the first request is secure and reliable, the first core network device sends the second request to the second core network device, to ensure security of the second core network device.

For example, the first request being valid may include that a parameter in the first request meets a user subscription and a policy. The parameter in the first request may include a QoS level, a session type, or the like, and the session type may include an ultra-reliable and low latency communication (URLLC) service, a high-definition voice service, or the like. Correspondingly, the first request being invalid may include a case in which the terminal device is not authenticated to send the seventh request, or the parameter in the first request does not meet the user subscription and the policy.

It may be understood that, the descriptions of whether the first request is valid or invalid in this embodiment of this application are also applicable to whether the second request is valid in the following. Details are not described below again.

504: The second core network device sends a second response to the first core network device. Correspondingly, the first core network device receives the second response from the second core network device, where the second response is used to respond to the second request.

In this embodiment of this application, the second response may be used to acknowledge the second request or reject the second request.

When the second response is used to acknowledge the second request, the second response may include first session configuration information, and the first session configuration information indicates session configuration information of a third core network device corresponding to the terminal device. For example, the first session configuration information may include information about the third core network device corresponding to the terminal device, for example, an identifier of the third core network device or an identifier of the terminal device. For the information about the third core network device corresponding to the terminal device, refer to the foregoing information about the terminal device and the second core network device. Details are not described herein again. The second response may further include quality of service (QoS) class identifier (QCI) configuration information.

A reason why the second response is used to reject the second request may include that the second request is invalid, may include that the second core network device does not find the third core network device corresponding to the terminal device, or the like. A reason why the second core network device rejects the second request is not limited in this embodiment of this application.

In some embodiments, that the second core network device sends a second response to the first core network device includes: When the second request is valid, the second core network device sends the second response to the first core network device. Herein, for descriptions about whether the second request is valid or invalid, refer to the foregoing descriptions about whether the first request is valid or invalid, and details are not described herein again.

505: The first core network device sends a first response to the access network device, where the first response is used to respond to the first request. Correspondingly, the access network device receives the first response.

That the first core network device sends a first response to the access network device includes: When the first session configuration information is valid, the first core network device sends the first response to the access network device. For example, the first core network device may determine validity of session configuration information of the terminal device based on the first session configuration information sent by the second core network device. If a policy or the like in the first core network device is met, the first core network device may send the first response to the access network device. The policy in the first core network device may include a network-level policy, a basic configuration policy or fee policy of the terminal device, or the like.

When the first session configuration information is valid, the first response may include the first session configuration information, or the first response may include the first session configuration information and second session configuration information. For example, using the network architecture shown in FIG. 3*b* as an example, the first response may include the first session configuration information and the second session configuration information. For example, using the network architecture shown in FIG. 3*c* as an example, the first response may include the first session configuration information. For another example, using the network architecture shown in FIG. 4*a* or FIG. 4*c* as an example, the first response may include the first session configuration information and the second session configuration information. Using the network architecture shown in FIG. 4*b* as an example, the first response may include the first session configuration information. The foregoing second session configuration information may be used to indicate session configuration information of a fourth core network device. In other words, when the first session configuration information is valid, the first core network device may send the session configuration information of the fourth core network device and the session configuration information of the third core network device to the access network device. For example, the session configuration information may include session QCI information, session gateway information, or session related policy information. This is not limited in this embodiment of this application.

However, when the first core network device determines that the first session configuration information is invalid, the first core network device may reject the first session configuration information, that is, reject the session configuration sent by the second core network device.

506: The first core network device establishes the session based on the first response.

In this embodiment of this application, establishing the session based on the first response indicates that after obtaining the first session configuration information and the second session configuration information, the first core network device may establish the session for the terminal device. In other words, the first core network device may interact with the third core network device, to establish a session between the terminal device and the third core network device. In some embodiments, the first core network device may alternatively interact with the fourth core network device, to establish a session between the terminal device and the fourth core network device.

For example, as shown in FIG. 5, that the first core network device establishes the session based on the first response includes:

5063: The first core network device sends a third request to the third core network device based on the first session configuration information, where the third request is used to request to establish the session between the terminal device and the third core network device.

5064: The first core network device receives a third response from the third core network device, where the third response is used to respond to the third request.

The third request herein may also be referred to as a session creation request. After receiving the third request, the third core network device establishes a data tunnel in the following two manners in this embodiment of this application:

In a first manner, when the network architecture does not include the fourth core network device (for example, an NDP), after receiving the third request, the third core network device establishes a data tunnel between the access network device and the third core network device.

In a second manner, when the network architecture includes the fourth core network device (for example, an NDP), after receiving the third request, the third core network device establishes a data tunnel between the fourth core network device and the third core network device. A reason why the third core network device may establish only the data tunnel between the fourth core network device and the third core network device is that when the first core network device sends a fourth request to the fourth core network device, the fourth core network device receives the fourth request, and may establish a data tunnel between the access network device and the fourth core network device.

For example, the data tunnel may include a general packet radio service (general packet radio service, GPRS) tunneling protocol (GPRS tunneling protocol, GTP) tunnel, a virtual private network (virtual private network, VPN) tunnel, or the like. A specific type of the data tunnel is not limited in this embodiment of this application.

For example, as shown in FIG. 5, that the first core network device establishes the session based on the first response includes:

5061: The first core network device sends the fourth request to the fourth core network device based on the second session configuration information, where the fourth request is used to request to establish the session between the terminal device and the fourth core network device.

5062: The first core network device receives a fourth response from the fourth core network device, where the fourth response is used to respond to the fourth request.

The fourth request herein may also be referred to as a session creation request. After receiving the fourth request, the fourth core network device may establish the data tunnel between the access network device and the fourth core network device.

In some embodiments, the method shown in FIG. 5 further includes step 507 and step 508.

507: The access network device configures a radio bearer (radio bearer) based on the first response. In other words, the access network device configures the radio bearer based on the first session configuration information and/or the second session configuration information.

508: The access network device sends a seventh response to the terminal device, and correspondingly, the terminal device receives the seventh response.

The seventh response may include radio bearer configuration information, for example, QCI information.

In this embodiment of this application, after receiving the seventh response, the terminal device may further send acknowledgment signaling to the access network device. The access network device sends the acknowledgment signaling to the first core network device, and the first core network device sends the acknowledgment signaling to the second core network device. The acknowledgment signaling is used to acknowledge the radio bearer. In other words, it may be determined, by sending the acknowledgment signaling, that the radio bearer has been established. In this way, the terminal device may transmit data and/or signaling through the radio bearer and the data tunnel described above. In other words, after receiving the seventh response, the terminal device may perform a session based on the seventh response. Alternatively, after receiving the seventh response and sending the acknowledgment signaling, the terminal device may perform a session.

According to the method provided in this embodiment of this application, the first core network device interacts with the second core network device corresponding to the terminal device, so that session establishment of the terminal device can be implemented, thereby simplifying core network deployment. In addition, the second core network device corresponding to the terminal device implements related processing on the terminal device, and this can improve security of the terminal device without requiring in the session establishment of the terminal device.

Figure 6:
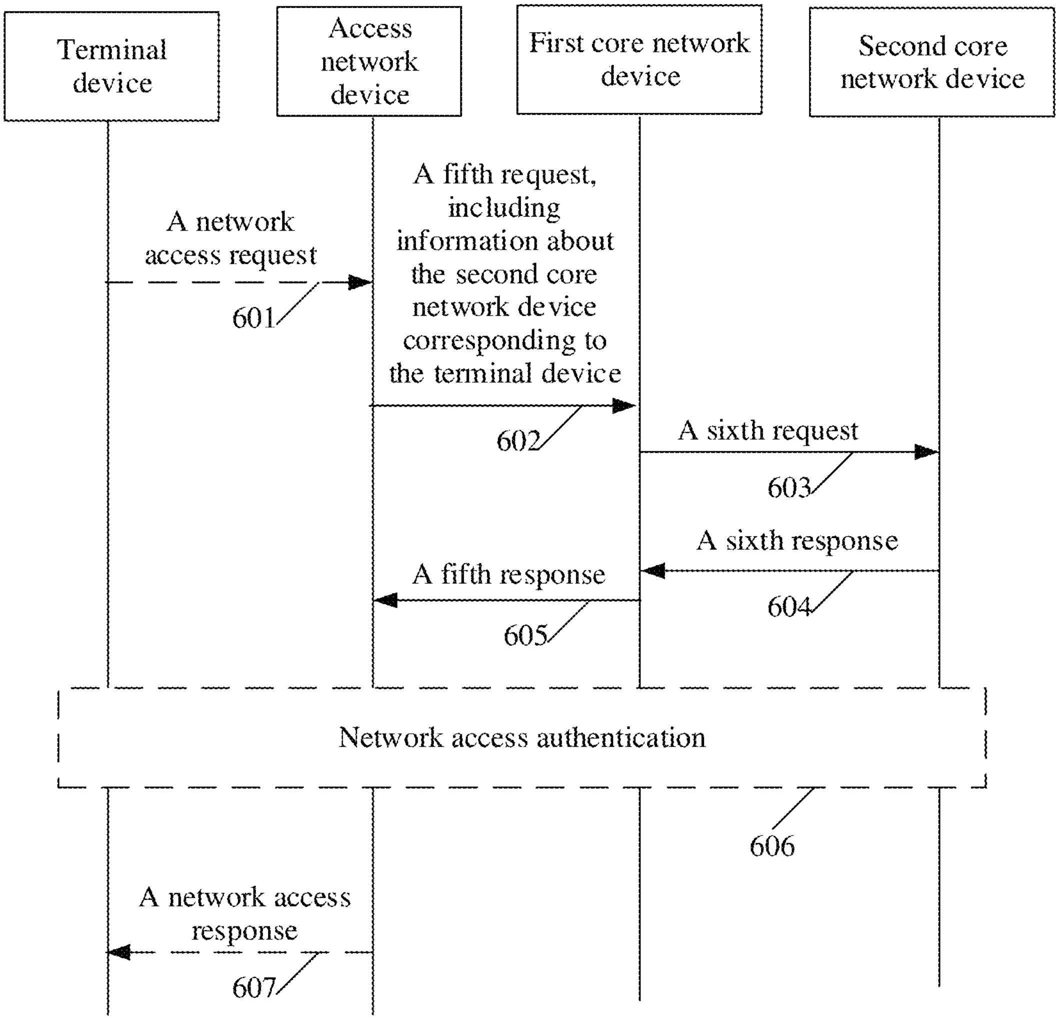
FIG. 6 is a schematic flowchart of a session establishment method according to an embodiment of this application.

FIG. 6 is a schematic flowchart of another session establishment method according to an embodiment of this application. As shown in FIG. 6, the method includes the following steps.

In some embodiments, the method shown in FIG. 6 includes step 601.

601: A terminal device sends a network access request to an access network device, where the network access request is used to request to access a network. Correspondingly, the access network device receives the network access request.

The network access request herein may further be carried in a non-access (non-access, NAS) message or the like. This is not limited in this embodiment of this application.

602: The access network device sends a fifth request to a first core network device. Correspondingly, the first core network device receives the fifth request, the fifth request is used to request to authenticate a network access request of the terminal device, and the fifth request includes information about a second core network device corresponding to the terminal device.

It may be understood that for a relationship between the fifth request and the network access request in step 601, a description of the information about the second terminal device corresponding to the terminal device, and a relationship between the fifth request and a sixth request, refer to the foregoing embodiments. Details are not described herein again.

603: The first core network device sends the sixth request to the second core network device according to the fifth request. Correspondingly, the second core network device receives the sixth request.

For example, the first core network device may send the sixth request to the second core network device based on an identifier of the second core network device. Alternatively, the first core network device sends, based on an identifier of the terminal device, the sixth request to the second core network device corresponding to the terminal device.

When the fifth request includes the identifier of the terminal device, for a method for determining, by the first core network device based on the identifier of the terminal device, the identifier of the second core network device corresponding to the terminal device, refer to specific descriptions of step 503 in FIG. 5. Details are not described herein again.

604: The second core network device sends a sixth response to the first core network device. Correspondingly, the first core network device receives the sixth response, where the sixth response is used to respond to the sixth request.

The sixth response may be used to acknowledge the sixth request or reject the sixth request. For example, when the sixth request is valid, the second core network device may acknowledge the sixth request. However, when the sixth request is invalid, the second core network device may reject the sixth request. For descriptions about whether the sixth request is valid or invalid, refer to the descriptions about whether the first request is valid or invalid in FIG. 5, and details are not described herein again.

605: The first core network device sends a fifth response to the access network device. Correspondingly, the access network device receives the fifth response.

The fifth response is used to acknowledge the fifth request or reject the fifth request.

In some embodiments, the fifth response may further include the identifier of the second core network device. Therefore, when receiving a network access response from the access network device, the terminal device may learn the identifier of the second core network device corresponding to the terminal device. The network access response may be used to respond to the network access request in step 601. For a description of the network access response, refer to step 607 shown below.

In some embodiments, the method shown in FIG. 6 may further include step 606.

606: The first core network device and the second core network device perform network access authentication.

For example, a process in which the first core network device and the second core network device perform network access authentication may include:

1. The second core network device verifies an identity of the terminal device.

2. The terminal device verifies an identity of the first core network device.

3. The second core network device verifies a verification result of the terminal device, and the verification result is a result of verifying the identity of the first core network device by the terminal device.

For example, the method for verifying the identity of the terminal device by the second core network device is as follows: The first core network device sends a first authentication request to the second core network device, where the first authentication request carries the identifier (for example, an SUCI or a 5G GUTI) of the terminal device. Correspondingly, the second core network device receives the first authentication request. Then, the second core network device verifies the terminal device based on the identifier of the terminal device. For example, the second core network device decrypts the SUCI of the terminal device to obtain the SUPI, and determines legality of the identity of the terminal device based on the SUPI. When the identity verification of the terminal device succeeds, the second core network device sends a first authentication response to the first core network device.

A method for verifying the identity of the first core network device by the terminal device is as follows: The first core network device sends a second authentication request to the terminal device, where the second authentication request is used to request to perform authentication on the first core network device. Then, the terminal device performs authentication on the first core network device, and sends a second authentication response to the first core network device after the authentication succeeds.

A method for verifying the verification result of the terminal device by the second core network device is as follows: The first core network device sends the second authentication response to the second core network device; and after receiving the second authentication response, the second core network device determines, through comparison, whether network information in the second authentication response is correct, and returns acknowledgment signaling if the network information is correct.

It may be understood that the network access authentication described above is merely an example. For a specific authentication process, refer to a related protocol, a related standard, or the like. This is not limited in this embodiment of this application.

607: The access network device sends a network access response to the terminal device. Correspondingly, the terminal device receives the network access response.

In this embodiment of this application, when the terminal device needs to access a network, a network-level core network interacts with a user-level core network corresponding to the terminal device, so that the terminal device can access the network. This not only avoids a complex process of accessing the network by the terminal device, but also ensures security of the terminal device.

It may be understood that for various focuses of the methods shown in FIG. 5 and FIG. 6. For an implementation that is not described in detail in one embodiment, refer to another embodiment. Details are not described herein again. In some embodiments, the methods shown in FIG. 5 and FIG. 6 may be combined. For example, according to the method shown in FIG. 6, after the terminal device accesses the network, the terminal device may further send a seventh request to the access network device to request to establish a session, and the like. Details are not described herein.

The following describes an apparatus according to an embodiment of this application.

Figure 7:
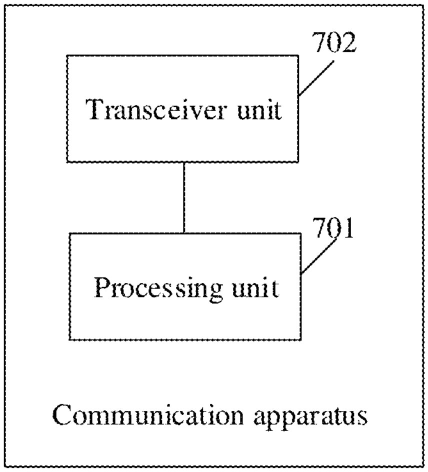
FIG. 7 to FIG. 9 are schematic diagrams of structures of a communication apparatus according to an embodiment of this application.

FIG. 7 is a schematic diagram of a structure of a communication apparatus according to an embodiment of this application. As shown in FIG. 7, the communication apparatus includes a processing unit 701 and a transceiver unit 702.

In some embodiments of this application, the communication apparatus may be the first communication apparatus described above, or the communication apparatus may be the first core network device described above, or the like.

The transceiver unit 702 is configured to: input a first request, where the first request is used to request to establish a session of a terminal device, and the first request includes information about a second core network device corresponding to the terminal device; output a second request according to the first request; input a second response, where the second response is used to respond to the second request; and output a first response, where the first response is used to respond to the first request.

The processing unit 701 is configured to establish the session based on the first response.

In this embodiment of this application, that the transceiver unit inputs the first request includes: The transceiver unit receives the first request from an access network device. That the transceiver unit outputs the second request includes: The transceiver unit sends the second request to the second core network device. That the transceiver unit inputs the second response includes: The transceiver unit receives the second response from the second core network device. That the transceiver unit outputs the first response includes: The transceiver unit sends the first response to the access network device. That the processing unit is configured to establish the session based on the first response includes: The processing unit establishes the session based on the first response through the transceiver unit; or the processing unit controls the transceiver unit to establish the session based on the first response, or the like.

In some embodiments, the transceiver unit 702 is specifically configured to output the second request when the first request is valid.

In some embodiments, the processing unit 701 is specifically configured to: output a third request based on first session configuration information through the transceiver unit 702, where the third request is used to request to establish a session between the terminal device and a third core network device; and input a third response through the transceiver unit, where the third response is used to respond to the third request.

In some embodiments, the processing unit 701 is specifically configured to: output a fourth request based on second session configuration information through the transceiver unit 702, where the fourth request is used to request to establish a session between the terminal device and a fourth core network device; and input a fourth response through the transceiver unit, where the fourth response is used to respond to the fourth request.

In some embodiments, the transceiver unit 702 is further configured to: input a fifth request, where the fifth request is used to request to authenticate a network access request of the terminal device, and the fifth request includes the information about the second core network device corresponding to the terminal device; output a sixth request, and input a sixth response, where the sixth response is used to respond to the sixth request; and output a fifth response, where the fifth response is used to respond to the fifth request.

In this embodiment of this application, for descriptions of the information about the second core network device corresponding to the terminal device, an identifier of the terminal device, an identifier of the second core network device, a relationship between the terminal device and the second core network device, a function of the first core network device, a function of the second core network device, the first request, the second request, and the like, refer to the foregoing embodiments. Details are not described herein again.

It may be understood that, for specific descriptions of the transceiver unit and the processing unit that are described above, refer to the steps performed by the first core network device in the foregoing method embodiments. For example, for the specific descriptions of the transceiver unit and the processing unit, refer to the methods shown in FIG. 5 and/or FIG. 6. Details are not described herein again.

In some other embodiments of this application, the communication apparatus may be the second communication apparatus described above, or the communication apparatus may be the second core network device described above.

The transceiver unit 702 is configured to: input the second request, where the second request is obtained by the first core network device according to the first request from the access network device, the first request is used to request to establish the session of the terminal device, the first request is obtained by the access network device based on a seventh request of the terminal device, and the first request includes the information about the second core network device corresponding to the terminal device; and output the second response, where the second response is used to respond to the second request.

In this embodiment of this application, that the transceiver unit inputs the second request includes: The transceiver unit receives the second request from the first core network device. That the transceiver unit outputs the second response includes: The transceiver unit sends the second response to the first core network device. Alternatively, that the transceiver unit inputs the second request may be understood as: The processing unit inputs the second request through the transceiver unit; or the processing unit controls the transceiver unit to input the second request, or the like.

In some embodiments, the transceiver unit 702 is specifically configured to output the second response when the second request is valid.

In this embodiment of this application, for the descriptions of the information about the second core network device corresponding to the terminal device, the identifier of the terminal device, the identifier of the second core network device, the relationship between the terminal device and the second core network device, the function of the first core network device, the function of the second core network device, the first request, the second request, and the like, refer to the foregoing embodiments. Details are not described herein again.

It may be understood that, for the specific descriptions of the transceiver unit and the processing unit that are described above, refer to the steps performed by the second core network device in the foregoing method embodiments. For example, for the specific descriptions of the transceiver unit and the processing unit, refer to the methods shown in FIG. 5 and/or FIG. 6. Details are not described herein again.

In still some embodiments of this application, the communication apparatus may be the terminal device described above.

The processing unit 701 is configured to obtain the identifier of the second core network device corresponding to the terminal device.

The transceiver unit 702 is configured to: output the seventh request, where the seventh request is used to request to establish a session of the terminal device, and the seventh request includes the identifier of the second core network device; and input a seventh response, where the seventh response is used to respond to the seventh request. The processing unit is configured to perform a session based on the seventh response.

In this embodiment of this application, that the transceiver unit outputs the seventh request includes: The transceiver unit sends the seventh request to the access network device. That the transceiver unit inputs the seventh response includes: The transceiver unit receives the seventh response from the access network device. That the processing unit performs a session includes: The processing unit performs the session through the transceiver unit; or the processing unit controls the transceiver unit to perform the session.

It may be understood that, for the specific descriptions of the transceiver unit and the processing unit that are described above, refer to the steps performed by the terminal device in the foregoing method embodiments. For example, for the specific descriptions of the transceiver unit and the processing unit, refer to the methods shown in FIG. 5 and/or FIG. 6. Details are not described herein again.

Division into modules in embodiments of this application is an example; and is merely logical function division, and may be other division during actual implementation. In addition, functional modules or units in embodiments of this application may be integrated into one processor, or each of the modules or units may exist alone physically, or two or more of the modules or units may be integrated into one module or unit. The integrated modules or units may be implemented in a form of hardware, or may be implemented in a form of a software function module.

In some embodiments, in the communication apparatus shown in FIG. 7, the processing unit 701 may be one or more processors. The transceiver unit 702 may be a transceiver, or the transceiver unit 702 may be a sending unit and a receiving unit, where the sending unit may be a transmitter, the receiving unit may be a receiver, and the sending unit and the receiving unit are integrated into one component, for example, a transceiver. In this embodiment of this application, the processor and the transceiver may be coupled, or the like. A connection manner between the processor and the transceiver is not limited in this embodiment of this application.

Figure 8:
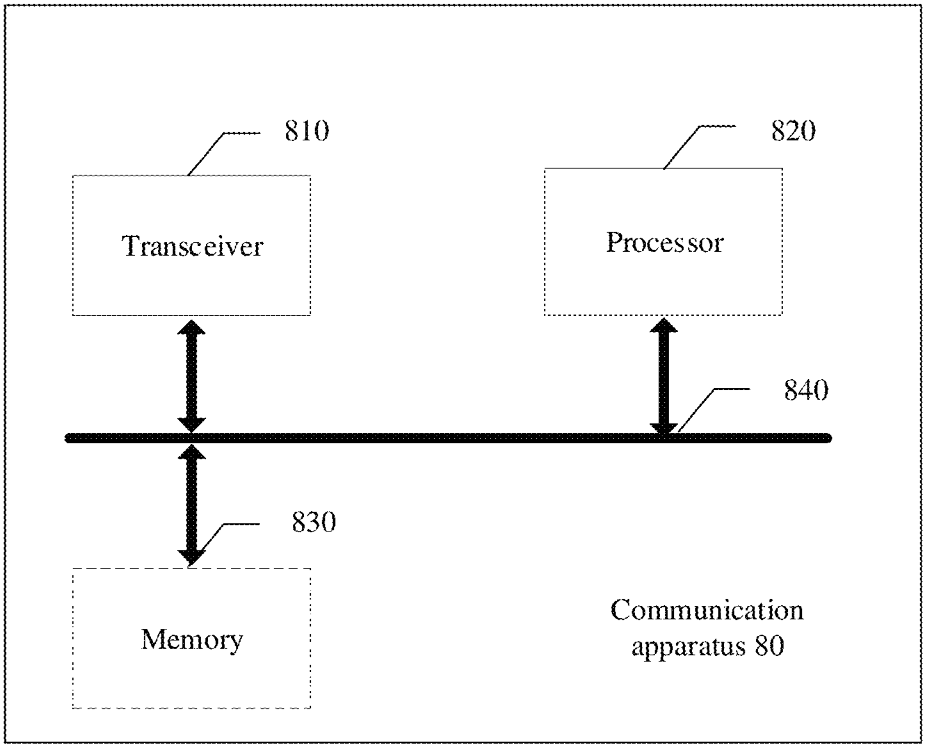

As shown in FIG. 8, a communication apparatus 80 includes one or more processors 820 and a transceiver 810.

In some embodiments of this application, the processor and the transceiver may be configured to perform a function, an operation, or the like performed by the first communication apparatus or first core network device described above.

For example, the transceiver 810 is configured to: receive a first request from an access network device; send a second request to a second core network device according to the first request; receive a second response from the second core network device; and send a first response to the access network device. The processor 820 is configured to establish a session based on the first response.

It may be understood that for specific descriptions of the processor and the transceiver, refer to the descriptions of the processing unit and the transceiver unit that are shown in FIG. 7. Details are not described herein again. For example, that the processor establishes a session based on the first response may also be understood as that the processor establishes the session through the transceiver, and the like.

For another example, the transceiver 810 is specifically configured to: when the first request is valid, send the second request to the second core network device.

For another example, the processor 820 specifically sends a third request to a third core network device based on first session configuration information through the transceiver 810, and receives a third response from the third core network device.

For another example, the processor 820 specifically sends a fourth request to a fourth core network device based on second session configuration information through the transceiver 810, and receives a fourth response from the fourth core network device.

For another example, the transceiver 810 is further configured to: receive a fifth request from the access network device, send a sixth request to the second core network device, receive a sixth response from the second core network device, and send a fifth response to the access network device.

In some other embodiments of this application, the processor and the transceiver may be configured to perform a function, an operation, or the like performed by the second communication apparatus or second core network device described above.

For example, the transceiver 810 is configured to receive the second request from the first core network device, and send the second response to the first core network device.

In this embodiment of this application, that the transceiver unit inputs the second request includes: The transceiver unit receives the second request from the first core network device. That the transceiver unit outputs the second response includes: The transceiver unit sends the second response to the first core network device. Alternatively, that the transceiver unit inputs the second request may be understood as: The processing unit inputs the second request through the transceiver unit; or the processing unit controls the transceiver unit to input the second request, or the like.

For another example, the transceiver 810 is specifically configured to: when the second request is valid, send the second response to the first core network device.

In some other embodiments of this application, the processor and the transceiver may be configured to perform a function, an operation, or the like performed by the third communication apparatus or terminal device described above.

For example, the processor 820 is configured to obtain an identifier of the second core network device corresponding to the terminal device; the transceiver 810 is configured to send a seventh request to the access network device, and receive a seventh response from the access network device; and the processor 820 is further configured to perform a session based on the seventh response.

Implementations of the processor and the transceiver described in this embodiment of this application are merely examples. For specific implementations of the processor and the transceiver, refer to the embodiment shown in FIG. 7, or refer to the method shown in FIG. 5 or FIG. 6. Details are not described herein again.

It may be understood that, in the foregoing embodiments, for descriptions of the first request, the second request, the information about the second core network device corresponding to the terminal device, the identifier of the terminal device, the identifier of the second core network device, the relationship between the terminal device and the second core network device, the function of the first core network device, the function of the second core network device, and the like, refer to the foregoing embodiments. Details are not described herein again.

In each implementation of the communication apparatus shown in FIG. 8, the transceiver may include a receiver and a transmitter. The receiver is configured to perform a function (or an operation) of receiving, and the transmitter is configured to perform a function (or an operation) of transmitting. The transceiver is configured to communicate with another device/apparatus through a transmission medium.

In some embodiments, the communication apparatus 80 may further include one or more memories 830, configured to store a program instruction and/or data. The memory 830 is coupled to the processor 820. The coupling in this embodiment of this application is indirect coupling or a communication connection between apparatuses, units, or modules for information exchange between the apparatuses, the units, or the modules, and may be in electrical, mechanical, or other forms. The processor 820 may operate in collaboration with the memory 830. The processor 820 may execute the program instruction stored in the memory 830. In some embodiments, at least one of the one or more memories may be included in the processor.

In this embodiment of this application, a specific connection medium among the transceiver 810, the processor 820 and the memory 830 is not limited. In this embodiment of this application, in FIG. 8, the memory 830, the processor 820, and the transceiver 810 are connected to each other by using a bus 840. The bus is represented by using a thick line in FIG. 8. A manner of connection between other components is only schematically described, but is not used as a limitation. The bus may be classified into an address bus, a data bus, a control bus, and the like. For ease of representation, only one thick line is used for representing the bus in FIG. 8, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any processor or the like. The steps of the methods disclosed with reference to embodiments of this application may be directly executed and accomplished by a hardware processor, or may be executed and accomplished by using a combination of hardware and software modules in the processor.

In this embodiment of this application, the memory may include but is not limited to a nonvolatile memory, for example, a hard disk drive (HDD) or a solid-state drive (SSD), a random-access memory (RAM), an erasable programmable read-only memory (EPROM), a read-only memory (ROM), or a compact disc read-only memory (CD-ROM). The memory is any storage medium that can be used to carry or store program code in a form of an instruction or a data structure and that can be read and/or written by a computer (for example, the communication apparatus shown in this application). However, this is not limited thereto. The memory in this embodiment of this application may alternatively be a circuit or any other apparatus that can implement a storage function, and is configured to store program instructions and/or data.

It may be understood that the communication apparatus shown in this embodiment of this application may further have more components and the like than those in FIG. 8. This is not limited in this embodiment of this application. The methods performed by the processor and the transceiver are merely examples. For specific steps performed by the processor and the transceiver, refer to the methods described above.

Figure 9:
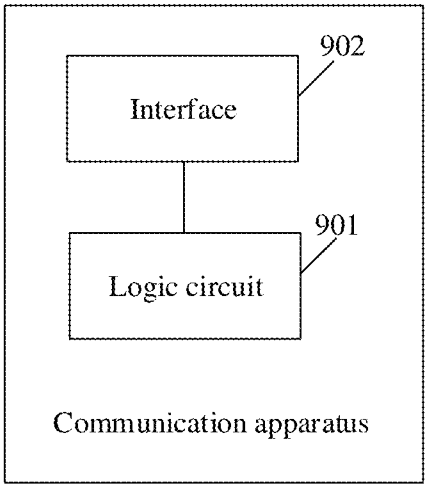

In another possible implementation, in the communication apparatus shown in FIG. 7, the processing unit 701 may be one or more logic circuits, and the transceiver unit 702 may be an input/output interface, or referred to as a communication interface, an interface circuit, an interface, or the like. Alternatively, the transceiver unit 702 may be a sending unit and a receiving unit. The sending unit may be an output interface, and the receiving unit may be an input interface. The sending unit and the receiving unit are integrated into one unit, for example, an input/output interface. As shown in FIG. 9, the communication apparatus shown in FIG. 9 includes a logic circuit 901 and an interface 902. That is, the processing unit 701 may be implemented by using the logic circuit 901, and the transceiver unit 702 may be implemented by using the interface 902. The logic circuit 901 may be a chip, a processing circuit, an integrated circuit, a system on chip (SoC) chip, or the like. The interface 902 may be a communication interface, an input/output interface, or the like. In this embodiment of this application, the logic circuit may further be coupled to the interface. A specific connection manner of the logic circuit and the interface is not limited in this embodiment of this application.

In some embodiments of this application, the logic circuit and the interface may be configured to perform a function, an operation, or the like performed by the first communication apparatus or the first core network device.

For example, the interface is configured to input a first request and output a second request; the interface is further configured to input a second response and output a first response; and the logic circuit is configured to establish a session based on the first response.

That the interface inputs the first request and outputs the second request herein may also be understood as the logic circuit controls the interface to input the first request and output the second request, and the like. This is not limited in this embodiment of this application.

For another example, the interface is further configured to output a third request and input a third response.

For another example, the interface is specifically configured to output a fourth response and input a fourth response.

For another example, the interface is further configured to input a fifth request and output a sixth response; and the interface is further configured to input the sixth request and output a fifth response.

In some other embodiments of this application, the logic circuit and the interface may be configured to perform a function, an operation, or the like performed by the second communication apparatus or the second core network device. For example, the logic circuit is configured to control the interface to input the second request and output the second response.

In some other embodiments of this application, the logic circuit and the interface may be configured to perform a function, an operation, or the like performed by the third communication apparatus or the terminal device. For example, the logic circuit is configured to obtain the identifier of the second communication apparatus corresponding to the third communication apparatus; the interface is configured to output a seventh request and input a seventh response; and the logic circuit is further configured to perform a session based on the seventh response.

That the logic circuit performs a session in this embodiment of this application includes: The logic circuit performs the session through the interface; or the logic circuit controls the interface to perform the session.

For specific implementations of the embodiments shown in FIG. 9, refer to the foregoing embodiments. Details are not described herein again.

In the foregoing embodiments, for the descriptions of the information about the second core network device corresponding to the terminal device, the identifier of the terminal device, the identifier of the second core network device, the relationship between the terminal device and the second core network device, the function of the first core network device, the function of the second core network device, the first request, the second request, and the like, refer to the foregoing embodiments. Details are not described herein again.

In addition, this application further provides a computer program. The computer program is used to implement the operations and/or processing performed by the first communication apparatus or the first core network device in the method provided in this application.

This application further provides a computer program. The computer program is used to implement the operations and/or processing performed by the second communication apparatus or the second core network device in the method provided in this application.

This application further provides a computer program. The computer program is used to implement the operations and/or processing performed by the third communication apparatus or the terminal device in the method provided in this application.

This application further provides a computer-readable storage medium. The computer-readable storage medium stores computer code. When the computer code is run on a computer, the computer is enabled to perform the operations and/or processing performed by the first communication apparatus or the second core network device in the method provided in this application.

This application further provides a computer-readable storage medium. The computer-readable storage medium stores computer code. When the computer code is run on a computer, the computer is enabled to perform the operations and/or processing performed by the second communication apparatus or the second core network device in the method provided in this application.

This application further provides a computer-readable storage medium. The computer-readable storage medium stores computer code. When the computer code is run on a computer, the computer is enabled to perform the operations and/or processing performed by the third communication apparatus or the terminal device in the method provided in this application.

This application further provides a computer program product. The computer program product includes computer code or a computer program. When the computer code or the computer program is run on a computer, the operations and/or processing performed by the first communication apparatus or the first core network device in the method provided in this application are performed.

This application further provides a computer program product. The computer program product includes computer code or a computer program. When the computer code or the computer program is run on a computer, the operations and/or processing performed by the second communication apparatus or the second core network device in the method provided in this application are performed.

This application further provides a computer program product. The computer program product includes computer code or a computer program. When the computer code or the computer program is run on a computer, the operations and/or processing performed by the third communication apparatus or the terminal device in the method provided in this application are performed.

In the embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the technical effects of the solutions provided in embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the technology of some approaches, or all or some of the technical solutions may be implemented in a form of a software product. The computer software product is stored in a readable storage medium, and includes several instructions for instructing a computer device (which may be a personal computer, a server, a network device, or the like) to perform all or some of the steps of the methods described in embodiments of this application. The readable storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for session establishment, wherein the method comprises:

receiving, by a first core network device, a first request from an access network device, wherein the first request is useable to request to establish a session of a terminal device, and the first request comprises information about a second core network device corresponding to the terminal device;

sending, by the first core network device, a second request to the second core network device based on the first request;

receiving, by the first core network device, a second response from the second core network device, wherein the second response is useable to respond to the second request;

sending, by the first core network device, a first response to the access network device, wherein the first response is useable to respond to the first request; and establishing, by the first core network device, the session based on the first response, wherein the information about the second core network device corresponding to the terminal device comprises at least one of:

an identifier of the terminal device or an identifier of the second core network device, and the identifier of the terminal device is associated with the identifier of the second core network device, wherein the second core network device is a control plane unit of a user-level core network, and the second core network device is configured to implement a network policy of the terminal device, and perform network access authentication.

2. The method according to claim 1, wherein the second core network device corresponds to the terminal device, or the second core network device corresponds to a plurality of terminal devices, the plurality of terminal devices comprising the terminal device.

3. The method according to claim 1, wherein the first core network device is configured to implement at least one of:

session management, policy management, charging management, or authentication management.

4. The method according to claim 3, wherein the first core network device is further configured to implement an access and mobility management function.

5. The method according to claim 1, wherein the second core network device is configured to implement at least one of:

subscriber data management, access management, user policy management, charging management, or session management.

6. The method according to claim 1, wherein the first core network device is configured to store a correspondence between the identifier of the terminal device and the identifier of the second core network device.

7. The method according to claim 1, wherein the sending, by the first core network device, the second request to the second core network device based on the first request comprises:

sending, by the first core network device, the second request to the second core network device based on the first request in response to the first request being valid.

8. The method according to claim 1, wherein the second response comprises:

first session configuration information useable to indicate session configuration information of a third core network device corresponding to the terminal device.

9. The method according to claim 8, wherein the establishing, by the first core network device, the session based on the first response comprises:

sending, by the first core network device, a third request to the third core network device based on the first session configuration information, wherein the third request is useable to request to establish a session between the terminal device and the third core network device; and receiving, by the first core network device, a third response from the third core network device, wherein the third response is useable to respond to the third request.

10. The method according to claim 1, wherein before the receiving, by the first core network device, the first request from the access network device, the method further comprises:

receiving, by the first core network device, a fifth request from the access network device, wherein the fifth request is useable to request to authenticate a network access request of the terminal device, and the fifth request comprises the information about the second core network device corresponding to the terminal device;

sending, by the first core network device, a sixth request to the second core network device based on the fifth request;

receiving, by the first core network device, a sixth response from the second core network device, wherein the sixth response is useable to respond to the sixth request; and sending, by the first core network device, a fifth response to the access network device, wherein the fifth response is useable to respond to the fifth request.

11. The method according to claim 1, wherein the first request is obtained by the access network device according to a seventh request of the terminal device.

12. A method for session establishment, wherein the method comprises:

receiving, by a second core network device, a second request from a first core network device, wherein the second request is obtained by the first core network device based on a first request of an access network device, the first request is useable to request to establish a session of a terminal device, the first request is obtained by the access network device according to a seventh request of the terminal device, and the first request comprises information about the second core network device corresponding to the terminal device; and sending, by the second core network device, a second response to the first core network device, wherein the second response is useable to respond to the second request, wherein the information about the second core network device corresponding to the terminal device comprises at least one of:

an identifier of the terminal device or an identifier of the second core network device, and the identifier of the terminal device is associated with the identifier of the second core network device, wherein the second core network device is a control plane unit of a user-level core network, and the second core network device is configured to implement a network policy of the terminal device, and perform network access authentication.

13. The method according to claim 12, wherein the sending, by the second core network device, the second response to the first core network device comprises:

sending, by the second core network device, the second response to the first core network device in response to the second request being valid.

14. The method according to claim 12, wherein the second core network device corresponds to the terminal device, or the second core network device corresponds to a plurality of terminal devices comprising the terminal device.

15. The method according to claim 12, wherein the first core network device is configured to implement at least one of:

session management, policy management, charging management or authentication management.

16. The method according to claim 15, wherein the first core network device is further configured to implement an access and mobility management function.

17. The method according to claim 12, wherein the second core network device is configured to implement at least one of:

subscriber data management,
access management,
user policy management,
charging management, or
session management.

18. The method according to claim 12, wherein the second response comprises:

first session configuration information useable to indicate session configuration information of a third core network device corresponding to the terminal device.

19. A method for session establishment, wherein the method comprises:

obtaining, by a terminal device, an identifier of a second core network device corresponding to the terminal device;

sending, by the terminal device, a seventh request, wherein the seventh request is useable to request to establish a session of the terminal device, and the seventh request comprises the identifier of the second core network device;

receiving, by the terminal device, a seventh response, wherein the seventh response is useable to respond to the seventh request; and performing, by the terminal device, the session based on the seventh response, wherein the second core network device is a control plane unit of a user-level core network, and the second core network device is configured to implement a network policy of the terminal device, and perform network access authentication;

an identifier of the terminal device is associated with the identifier of the second core network device; and at least one of the identifier of the terminal device or the identifier of the second core network device is part of information about the second core network device corresponding to the terminal device.

* * * * *